US012572112B2

(12) United States Patent (10) Patent No.: US 12,572,112 B2

Shimoda (45) Date of Patent: Mar. 10, 2026

(54) OPTICAL MEASUREMENT SYSTEM AND OPTICAL MEASUREMENT METHOD

(71) Applicant: Otsuka Electronics Co., Ltd., Osaka (JP)

(72) Inventor: Kensaku Shimoda, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 218 days.

(21) Appl. No.: 18/259,047

(22) PCT Filed: Dec. 22, 2021

(86) PCT No.: PCT/JP2021/047560
§ 371 (c)(1),
(2) Date: Jun. 22, 2023

(87) PCT Pub. No.: WO2022/138716
PCT Pub. Date: Jun. 30, 2022

(65) Prior Publication Data
US 2024/0045375 A1 Feb. 8, 2024

(30) Foreign Application Priority Data

Dec. 25, 2020 (WO) .................. PCT/JP2020/048942

(51) Int. Cl.
*G03H 1/04* (2006.01)
*G03H 1/00* (2006.01)
(52) U.S. Cl.
CPC ......... *G03H 1/0443* (2013.01); *G03H 1/0005* (2013.01); *G03H 2001/0038* (2013.01); *G03H 2001/0445* (2013.01)
(58) Field of Classification Search
CPC .. G03H 1/0443; G03H 1/0005; G03H 1/0465; G03H 2001/0038;

(Continued)

(56) References Cited

U.S. PATENT DOCUMENTS 5,907,404 A * 5/1999 Marron ..................... G01J 9/02
356/489
6,075,764 A 6/2000 Jacobowitz et al.
(Continued)

FOREIGN PATENT DOCUMENTS

EP 2905645 B1 3/2018
JP 2012145361 A * 8/2012
(Continued)

OTHER PUBLICATIONS

Colomb et al. "Total aberrations compensation in digital holographic microscopy with a reference conjugated hologram," Opt. Express 14, 4300-4306 (2006) (Year: 2006).*

(Continued)

*Primary Examiner* — Kara E. Geisel
*Assistant Examiner* — Christina I Xing
(74) *Attorney, Agent, or Firm* — Studebaker Brackett PLLC

(57) ABSTRACT

An optical measurement system capable of suppressing noise and realizing more accurate measurement is provided. The optical measurement system includes a light source, an image sensor, and an optical system including a beam splitter that divides light from the light source into first light and second light. The optical system can configure a first optical system that records with the image sensor, a first hologram resulting from modulation of first light with second light while there is no sample, the second light being diverging light, and a second optical system that records with the image sensor, a second hologram resulting from modulation with second light, of light obtained by illumination of a sample with first light. The second optical system includes a restriction mechanism that restricts spread of the light obtained by illumination of the sample with first light to be kept within a predetermined range.

18 Claims, 15 Drawing Sheets

(A)

(B)

(58) Field of Classification Search

CPC ..... G03H 2001/0445; G03H 2001/045; G03H 2222/44; G03H 2222/42; G03H 2222/52; G03H 2223/12; G01B 9/02047; G01B 9/021; G01B 11/2441; G01B 11/24; G01N 21/453

See application file for complete search history.

(56) References Cited

U.S. PATENT DOCUMENTS

| | | | | |
|---|---|---|---|---|
| 2007/0216906 A1* | 9/2007 | Javidi | ................. | G06V 20/695 356/457 |
| 2013/0100241 A1 | 4/2013 | Sato | | |
| 2015/0268628 A1* | 9/2015 | Sato | ................. | G01B 9/02091 356/457 |
| 2016/0259297 A1 | 9/2016 | Sato | | |
| 2020/0264559 A1 | 8/2020 | Sato | | |
| 2021/0325825 A1 | 10/2021 | Sato et al. | | |
| 2022/0349699 A1 | 11/2022 | Sato | | |

FOREIGN PATENT DOCUMENTS

| | | | | | |
|---|---|---|---|---|---|
| JP | 2018021841 A | * | 2/2018 | ............ | G01B 9/021 |
| TW | 420804 B | | 2/2001 | | |
| WO | 2012/005315 A1 | | 1/2012 | | |
| WO | 2014/054776 A1 | | 4/2014 | | |
| WO | 2015/064088 A1 | | 5/2015 | | |
| WO | 2019/044336 A1 | | 3/2019 | | |
| WO | 2020/045584 A1 | | 3/2020 | | |
| WO | 2020/045589 A1 | | 3/2020 | | |

OTHER PUBLICATIONS

Colomb et al. "Total aberrations compensation in digital holographic microscopy with a reference conjugated hologram," Opt. Express 14, 4300-4306 (2006) (Year: 2006) (Year: 2006).*

Colomb, T et al.; "Total aberrations compensation in digital holographic microscopy with a reference conjugated hologram"; Optics Express; May 15, 2006; pp. 4300-4306; 14(10); ISSN: 1094-4087, DOI: 10.1364/OE.14.004300; Optical Society of America; Lausanne, Switzerland.

Wagner, C et al.; "Digital recording and numerical reconstruction of lensless Fourier holograms in optical metrology"; Applied Optics; Aug. 1, 1999; pp. 4812-4820; 38(22); ISSN: 0003-6935, DOI: 10.1364/AO.38.004812; Optical Society of America; Retrieved from the Internet: URL: https://opg.optica.org/view_article.cfm?pdfKey=ac101077-db7d-40ee-9d2c57fece614b7f_44347.

Extended European Search Report issued in EP 21 91 0856.0-1001 by the European Patent Office on Nov. 11, 2024, which is related to U.S. Appl. No. 18/259,047.

International Search Report issued in PCT/JP2021/047560; mailed Mar. 22, 2022.

Notification of Transmittal of the International Search Report and the Written Opinion of the International Searching Authority, or the Declaration issued in PCT/JP2020/048942; mailed Mar. 16, 2021.

An Office Action issued by Taiwan Intellectual Property Office on Jul. 10, 2025, which corresponds to Taiwanese Patent Application No. 110148355 and is related to U.S. Appl. No. 18/259,047.

* cited by examiner

FIG.1
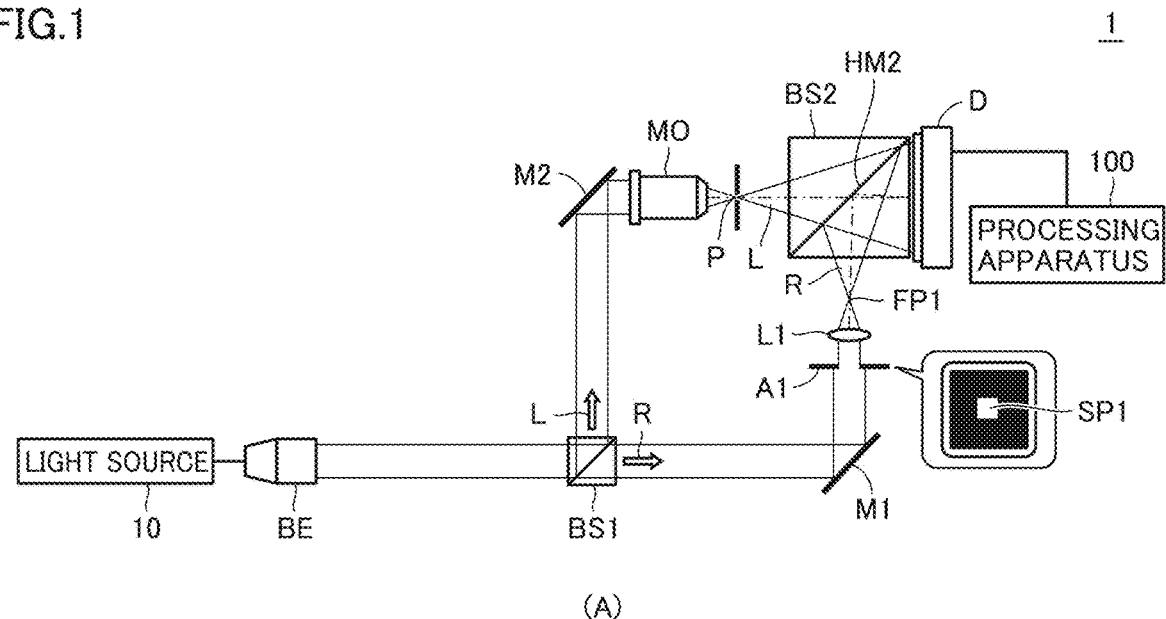
(A)
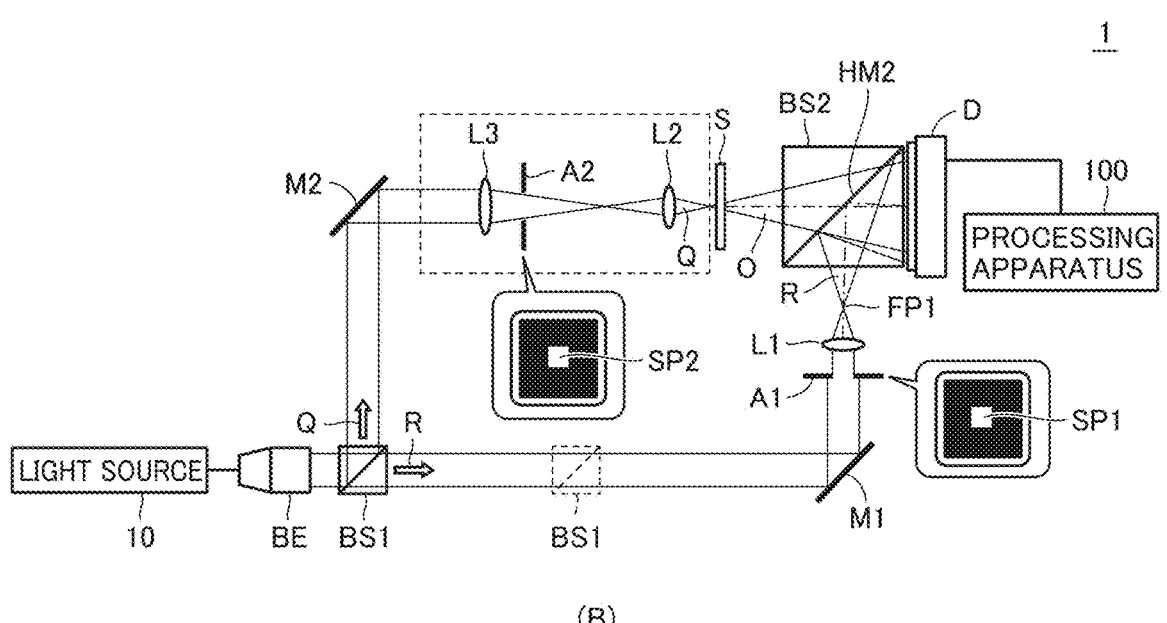
(B)

FIG.2
(A)
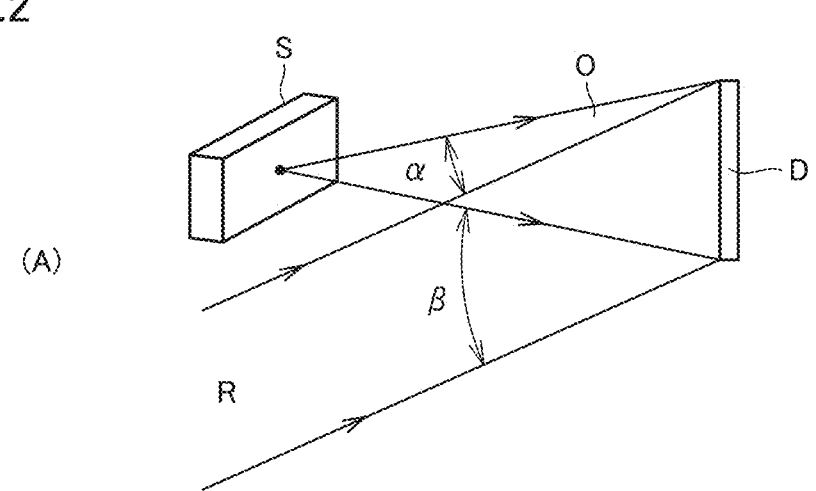
(B)
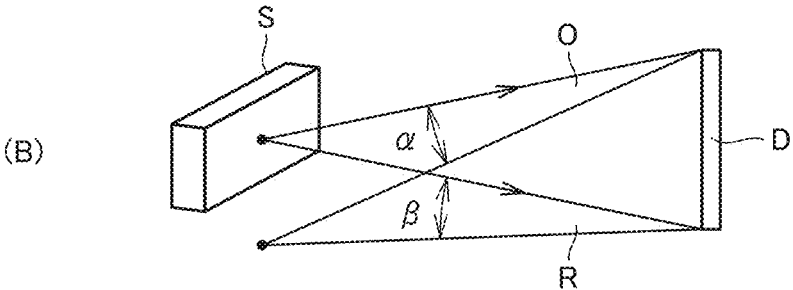

FIG.5
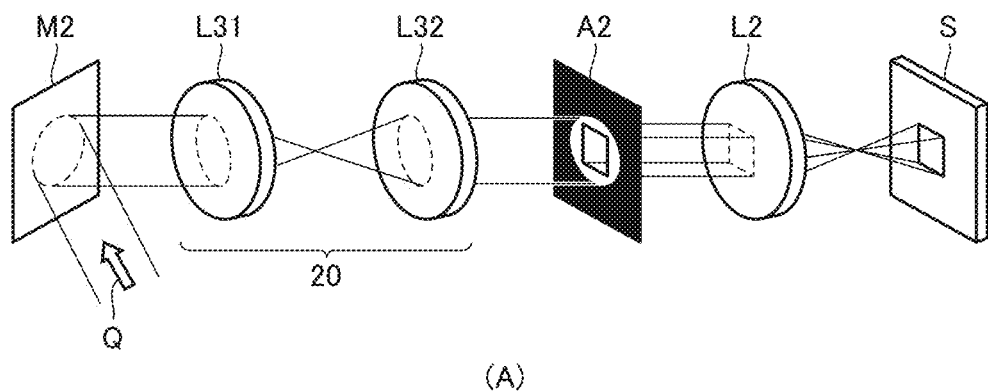
(A)
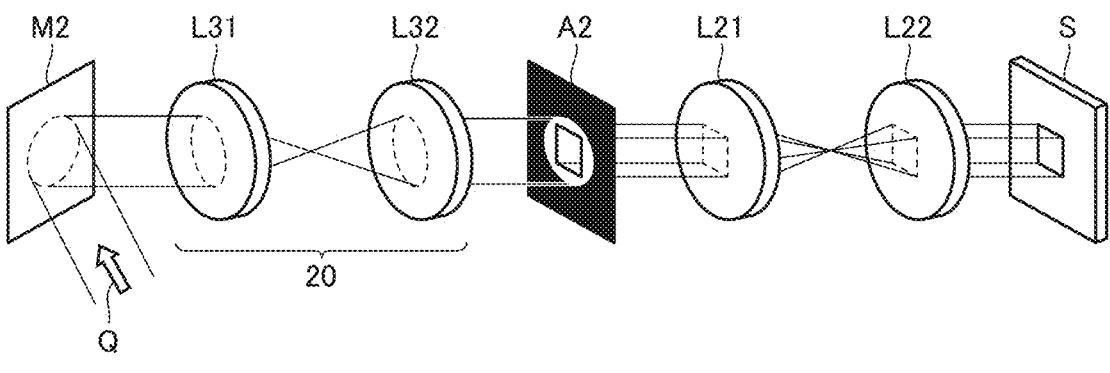
(B)

FIG.6

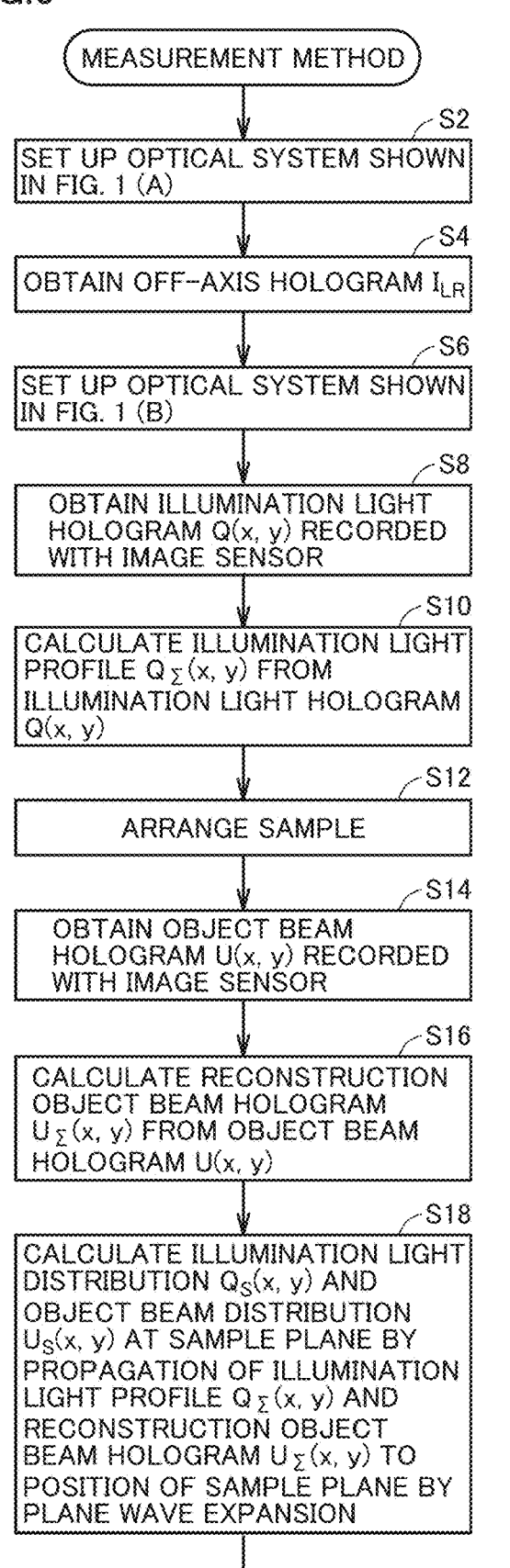
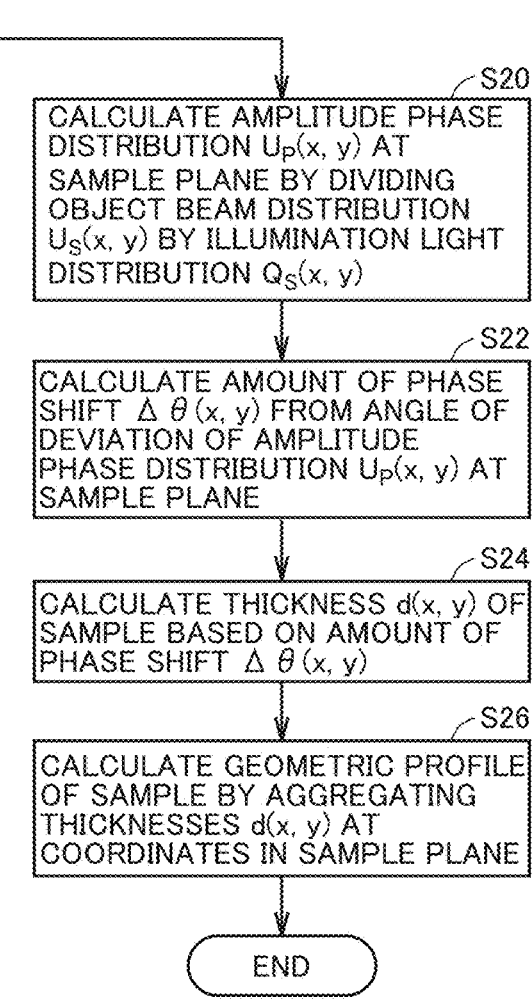

MEASUREMENT METHOD

S2
SET UP OPTICAL SYSTEM SHOWN IN FIG. 1 (A)

S4
OBTAIN OFF-AXIS HOLOGRAM $I_{LR}$

S6
SET UP OPTICAL SYSTEM SHOWN IN FIG. 1 (B)

S8
OBTAIN ILLUMINATION LIGHT HOLOGRAM $Q(x, y)$ RECORDED WITH IMAGE SENSOR

S10
CALCULATE ILLUMINATION LIGHT PROFILE $Q_\Sigma(x, y)$ FROM ILLUMINATION LIGHT HOLOGRAM $Q(x, y)$

S12
ARRANGE SAMPLE

S14
OBTAIN OBJECT BEAM HOLOGRAM $U(x, y)$ RECORDED WITH IMAGE SENSOR

S16
CALCULATE RECONSTRUCTION OBJECT BEAM HOLOGRAM $U_\Sigma(x, y)$ FROM OBJECT BEAM HOLOGRAM $U(x, y)$ S18
CALCULATE ILLUMINATION LIGHT DISTRIBUTION $Q_S(x, y)$ AND OBJECT BEAM DISTRIBUTION $U_S(x, y)$ AT SAMPLE PLANE BY PROPAGATION OF ILLUMINATION LIGHT PROFILE $Q_\Sigma(x, y)$ AND RECONSTRUCTION OBJECT BEAM HOLOGRAM $U_\Sigma(x, y)$ TO POSITION OF SAMPLE PLANE BY PLANE WAVE EXPANSION S20
CALCULATE AMPLITUDE PHASE DISTRIBUTION $U_P(x, y)$ AT SAMPLE PLANE BY DIVIDING OBJECT BEAM DISTRIBUTION $U_S(x, y)$ BY ILLUMINATION LIGHT DISTRIBUTION $Q_S(x, y)$ S22
CALCULATE AMOUNT OF PHASE SHIFT $\Delta\theta(x, y)$ FROM ANGLE OF DEVIATION OF AMPLITUDE PHASE DISTRIBUTION $U_P(x, y)$ AT SAMPLE PLANE S24
CALCULATE THICKNESS $d(x, y)$ OF SAMPLE BASED ON AMOUNT OF PHASE SHIFT $\Delta\theta(x, y)$ S26
CALCULATE GEOMETRIC PROFILE OF SAMPLE BY AGGREGATING THICKNESSES $d(x, y)$ AT COORDINATES IN SAMPLE PLANE

END

FIG.7
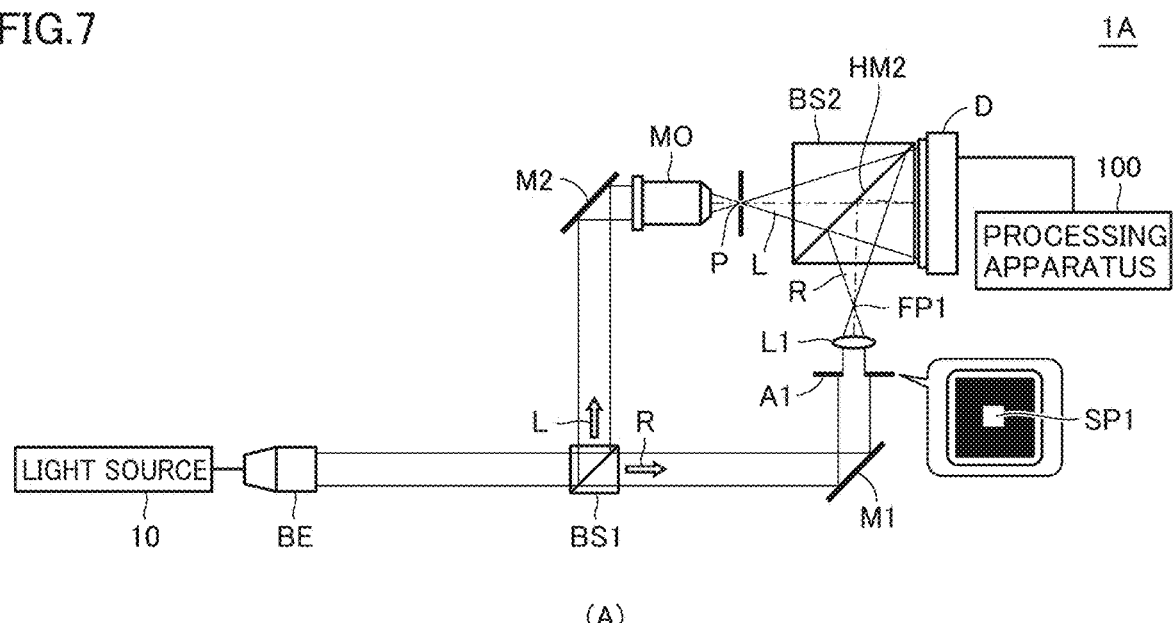
(A)
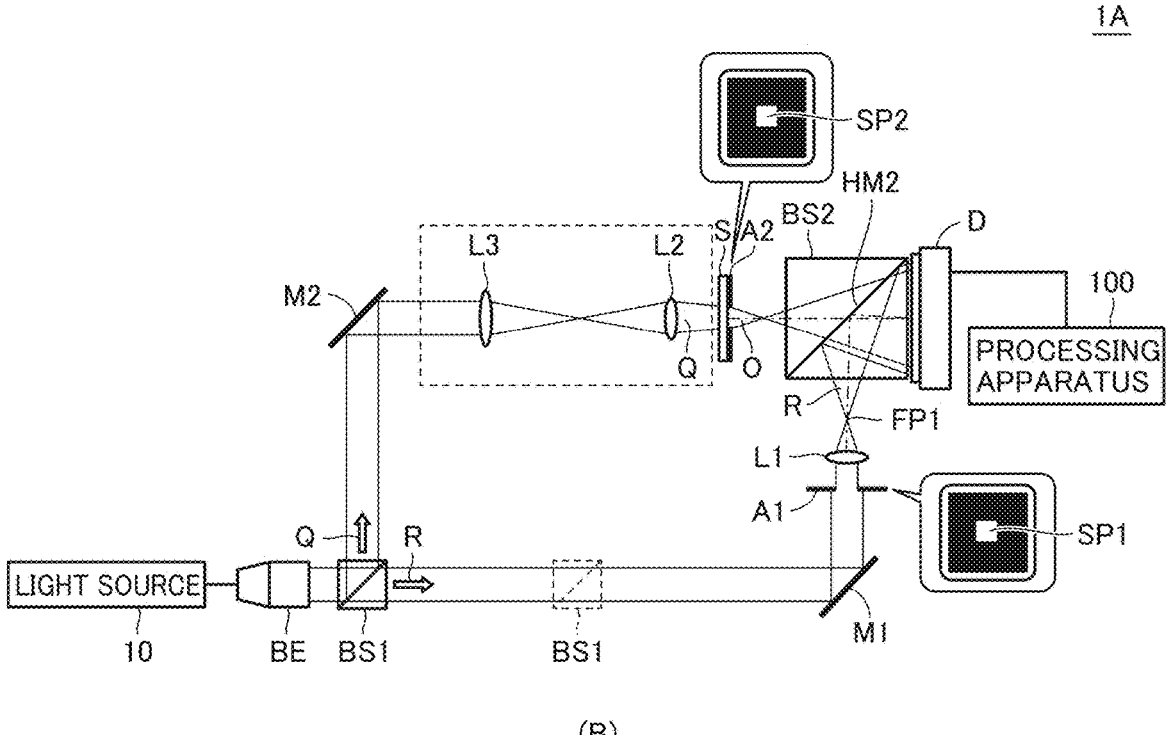
(B)

FIG.8
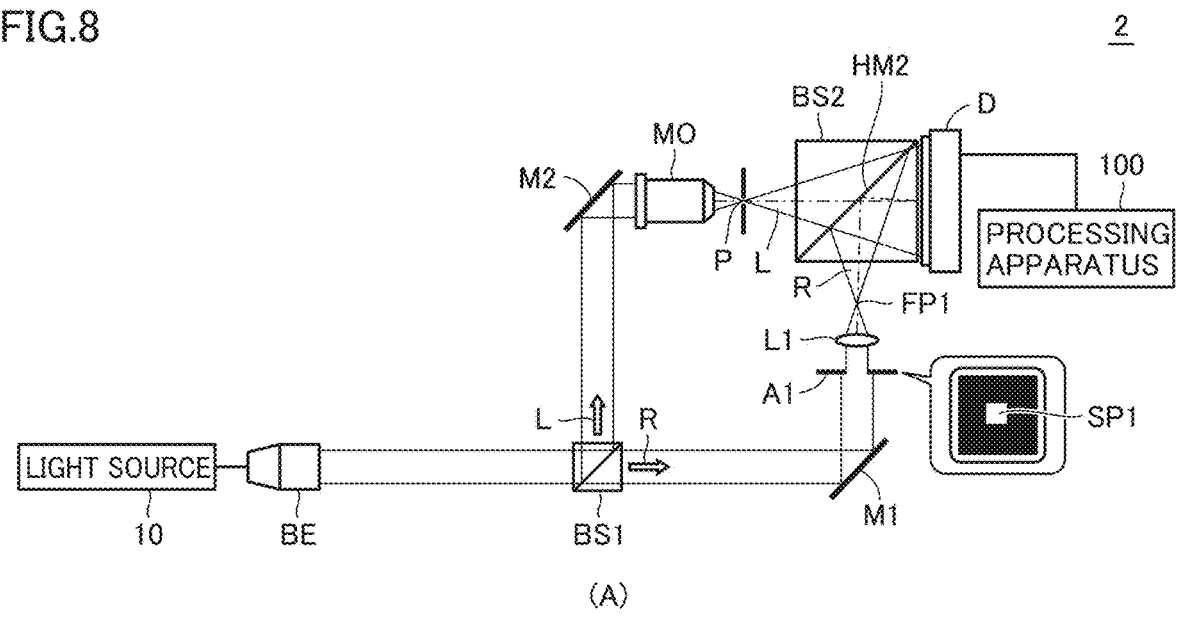
(A)
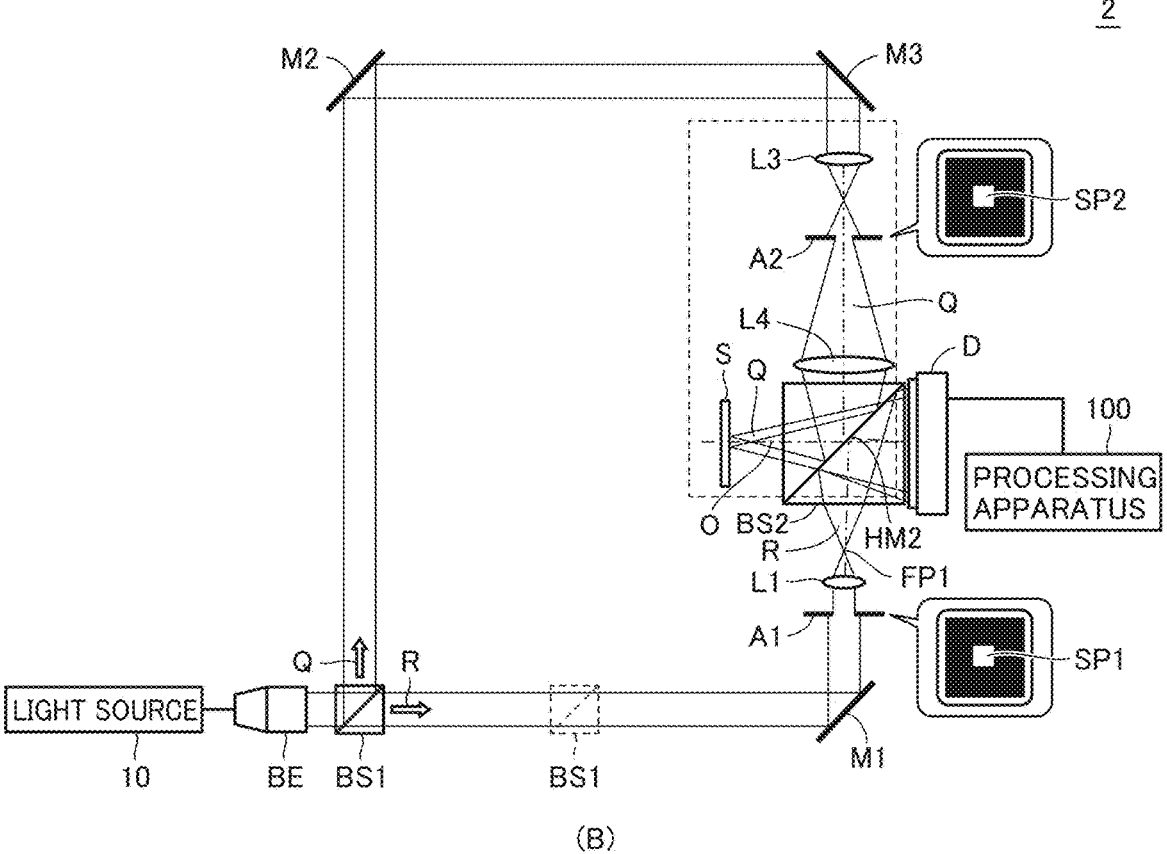
(B)

FIG.9
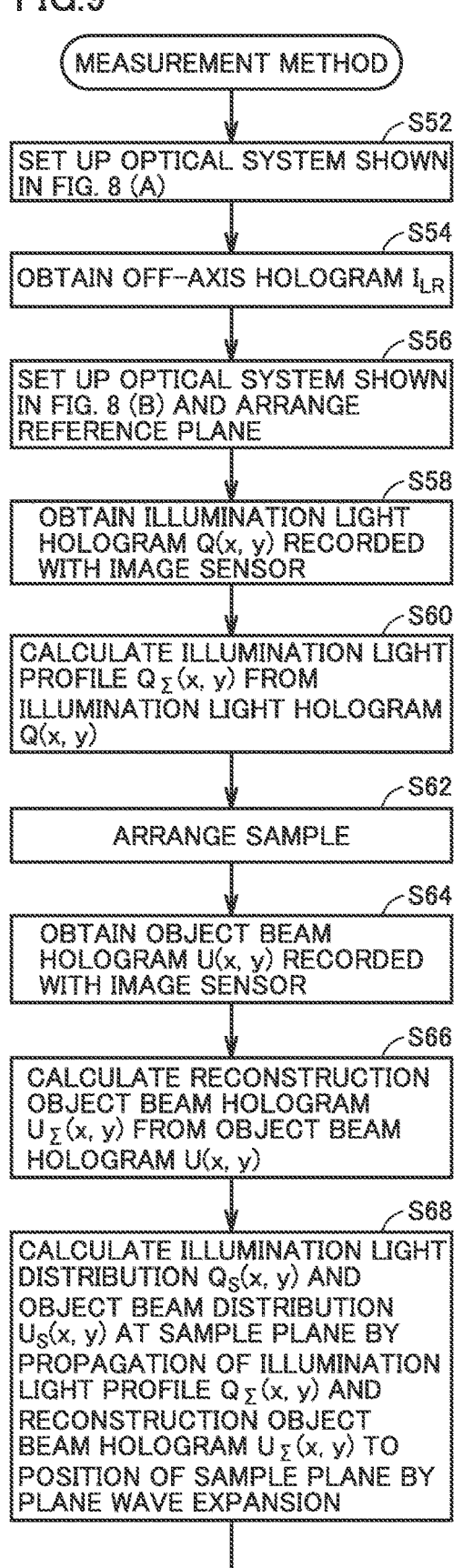
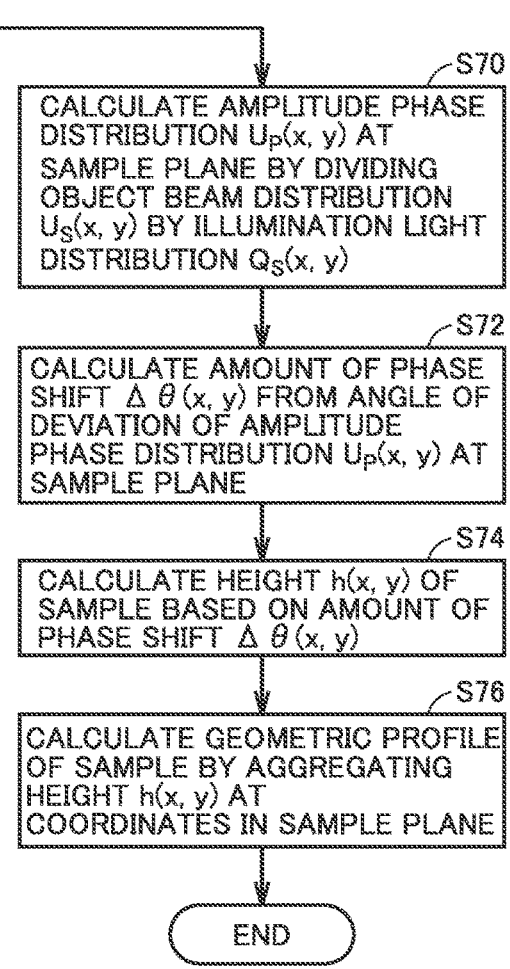

FIG.10
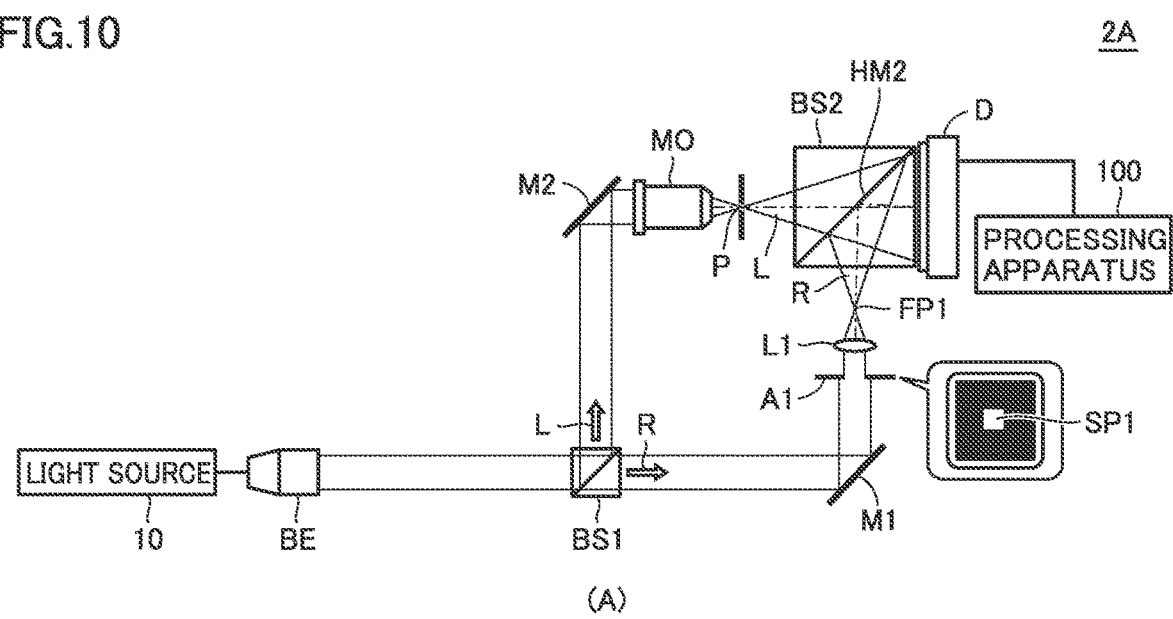
(A)
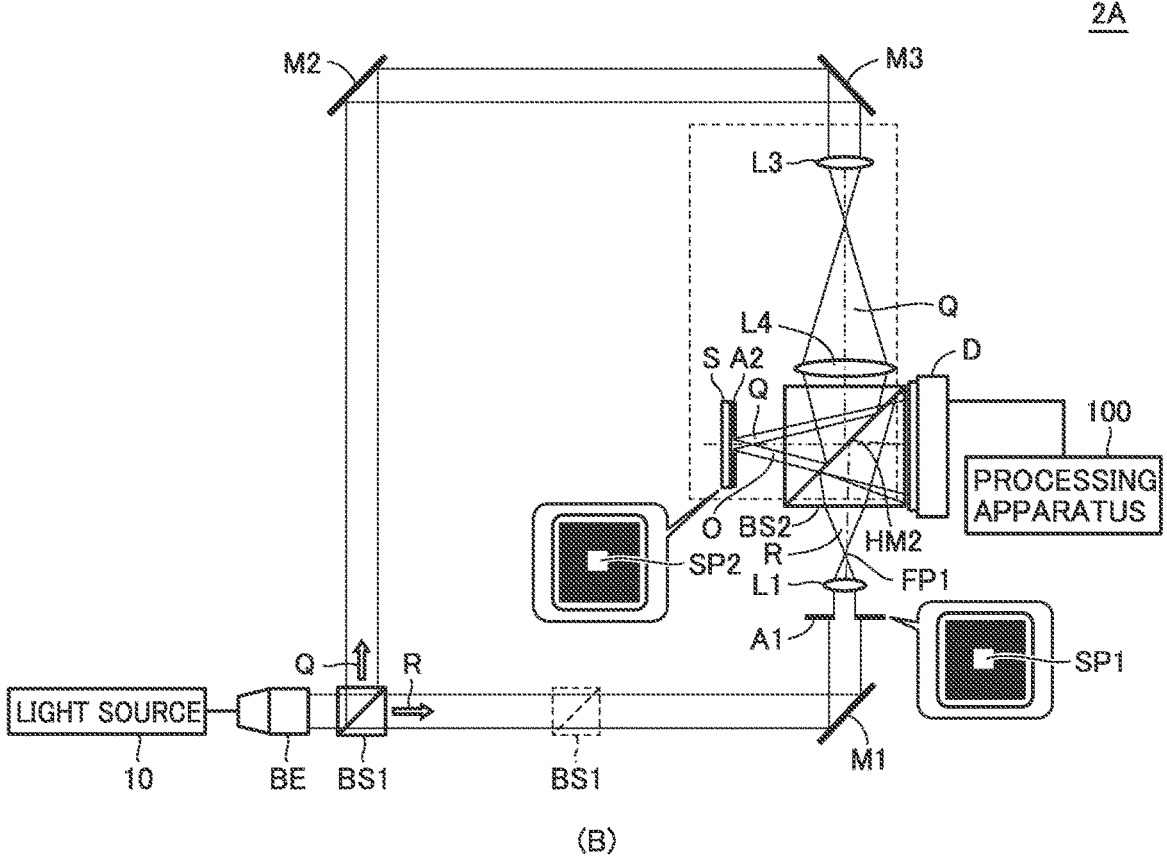
(B)

FIG.11
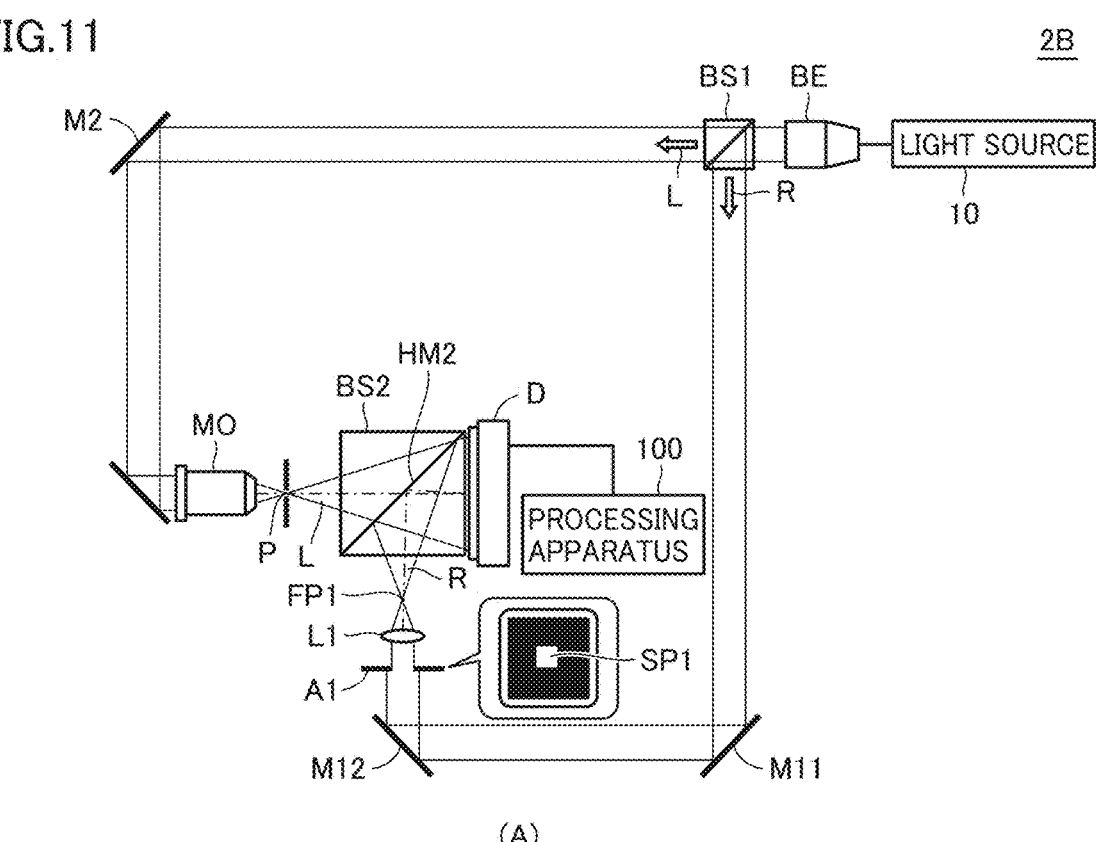
(A)
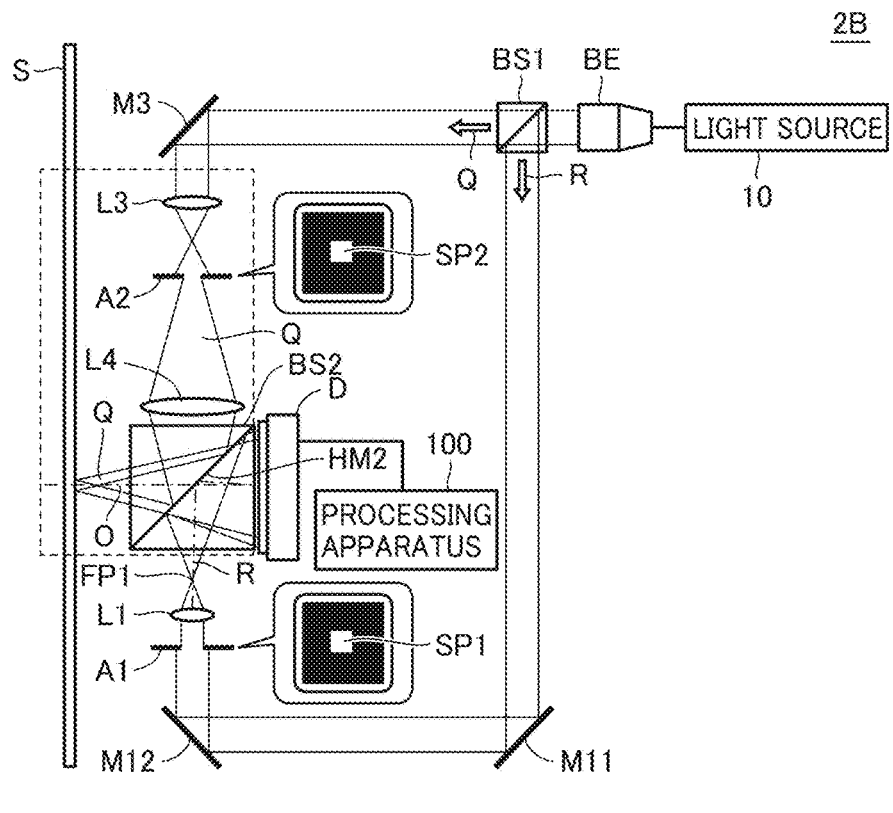
(B)

FIG.12
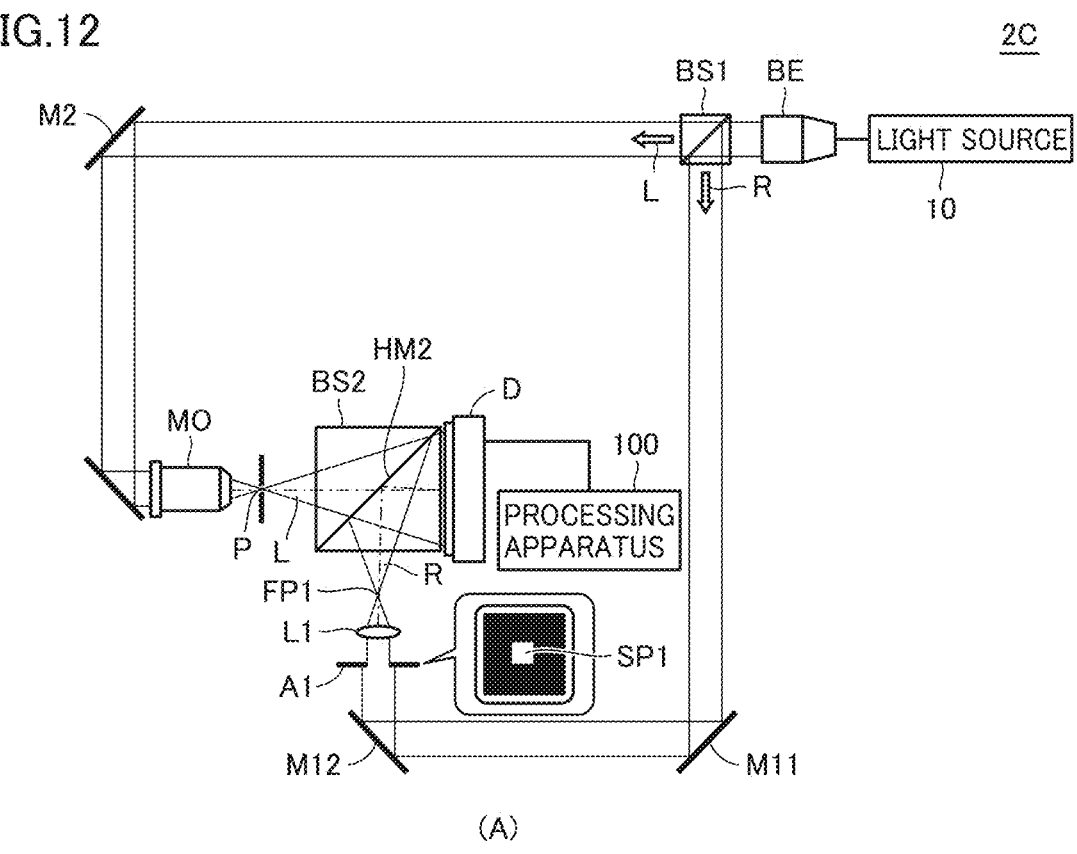
(A)
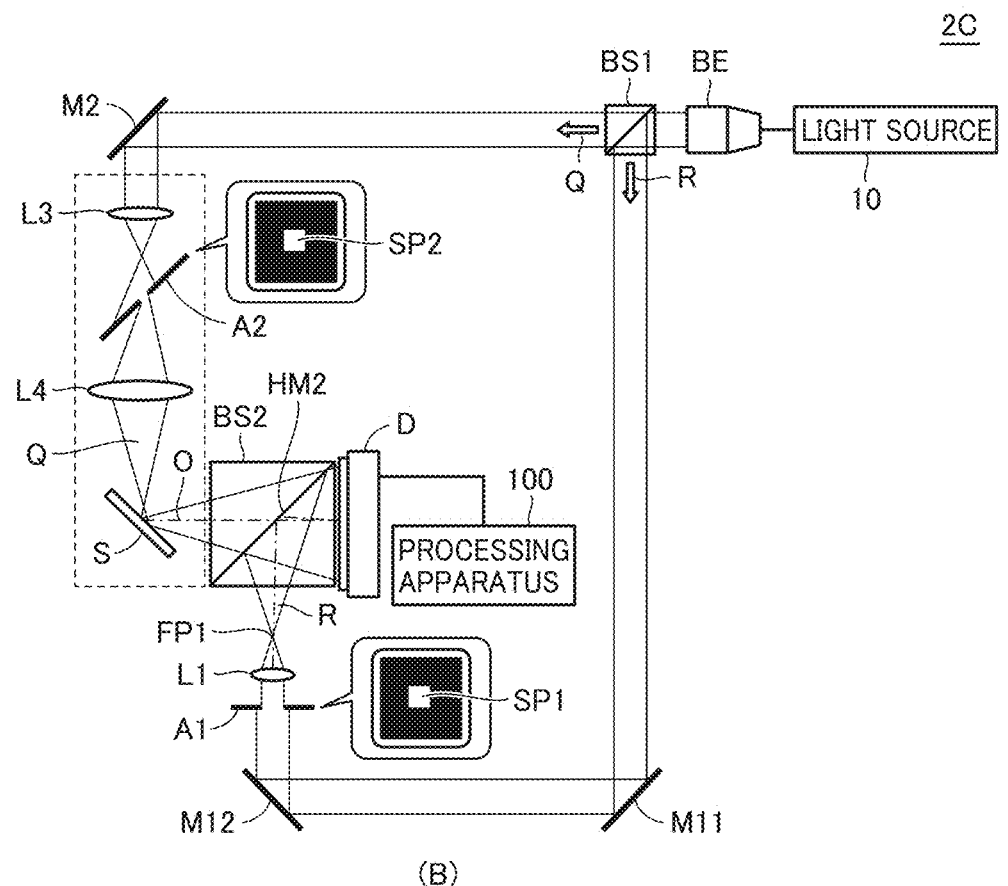
(B)

(A)

(B)

OPTICAL MEASUREMENT SYSTEM AND OPTICAL MEASUREMENT METHOD

TECHNICAL FIELD

The present invention relates to an optical measurement system and an optical measurement method that make use of digital holography.

BACKGROUND ART

A measurement method making use of white light interference and a measurement method making use of a confocal point have been known as methods of measurement of a geometry of a sample.

In the measurement method making use of white light interference, a sample is scanned in a direction of height with the use of a less coherent light source and a reference minor to obtain a geometry thereof from interference fringes. In the measurement method making use of a confocal point, a spot where light is condensed by an objective lens is scanned in a three-dimensional space to obtain a geometry of a sample. These methods are disadvantageous in deterioration of measurement accuracy under influence of vibration.

Digital holography has been proposed and put into practical use as a method of more accurate measurement of a geometry of a sample. Digital holography is a technique for measuring a geometry or the like of a sample by obtaining a shape of a wave front of an object beam by observing interference fringes produced as a result of superimposition on a reference beam, of the object beam produced as a result of irradiation of the sample with light. Prior art documents as below disclose measurement apparatuses using digital holography.

For example, WO2012/005315 (PTL 1) discloses a configuration capable of measuring a geometry of a sample by adoption of a reflection optical system.

WO2014/054776 (PTL 2) discloses a configuration that extracts information in a specific z plane by tomography.

WO2015/064088 (PTL 3) and WO2019/044336 (PTL 4) each disclose a configuration capable of achieving an improved lateral resolution (an XY plane).

WO2020/045584 (PTL 5) discloses a configuration including a cube-type beam coupler, the configuration readily realizing recording of a large numerical aperture and reflection-type illumination.

WO2020/045589 (PTL 6) discloses a configuration where a pinhole is used for a reference beam and illumination light to eliminate scattered light and interference noise and a spherical wave is defined as the reference so as to obviate the need for a physical reference plane.

CITATION LIST

Patent Literature

PTL 1: WO2012/005315
PTL 2: WO2014/054776
PTL 3: WO2015/064088
PTL 4: WO2019/044336

PTL 5: WO2020/045584
PTL 6: WO2020/045589

SUMMARY OF INVENTION

Technical Problem

For the optical measurement method using digital holography as described above, a configuration capable of suppressing noise caused by scattered light or unwanted light and realizing more accurate measurement has been demanded. One of objects of the present invention is to provide an optical measurement system capable of suppressing noise and realizing more accurate measurement.

Solution to Problem

An optical measurement system according to one aspect of the present invention includes a light source, an image sensor, and an optical system including a beam splitter that divides light from the light source into first light and second light. The optical system is configured to record with the image sensor, a first hologram resulting from modulation with the second light, of light obtained by illumination of a sample with the first light, the second light being diverging light. The optical system includes a restriction mechanism that restricts spread of the light obtained by illumination of the sample with the first light to be kept within a predetermined range.

The restriction mechanism may restrict a range where the sample is illuminated with the first light to be kept within the predetermined range.

The restriction mechanism may restrict a range where the light obtained by illumination of the sample with the first light passes to be kept within the predetermined range.

A size of a range where the sample is illuminated with the first light may be determined such that a component corresponding to the first light is not superimposed on a component other than the component corresponding to the first light in a spatial frequency domain of a hologram recorded with the image sensor.

The restriction mechanism may include such a mask that an opening pattern corresponding to the predetermined range is formed in a shielding member.

The restriction mechanism may be configured to be changeable in size of the opening pattern.

The optical system may be an off-axis holography optical system.

The optical system may generate the first hologram from transmitted light obtained by illumination of the sample with the first light. At this time, in the optical system, a second hologram may be recorded from transmitted light obtained by illumination with the first light, of a substrate instead of the sample, the substrate not being an object to be measured included in the sample.

The optical system may generate the first hologram from reflected light obtained by illumination of the sample with the first light. At this time, in the optical system, a second hologram may be recorded from transmitted light obtained by illumination with the first light, of a reference plane instead of the sample.

The optical measurement system may further include a processing apparatus that calculates a geometry of the sample based on the first hologram and the second hologram.

According to another aspect of the present invention, an optical measurement method using an optical system including a beam splitter that divides light from a light source into first light and second light is provided. The optical measurement method includes recording with an image sensor, a first hologram obtained by modulation with the second light, of light obtained by illumination of a sample with the first light, the second light being diverging light, recording with the image sensor, a second hologram resulting from modulation of the first light with the second light while there is no sample, the second light being diverging light, and calculating a geometry of the sample based on the first hologram and the second hologram. Spread of the light obtained by illumination of the sample with the first light is restricted to be kept within a predetermined range.

Advantageous Effects of Invention

According to one embodiment of the present invention, noise can be suppressed and more accurate measurement can be realized.

BRIEF DESCRIPTION OF DRAWINGS

FIG. 1 is a schematic diagram showing an exemplary configuration of an optical measurement system according to a first embodiment.

FIG. 2 is a diagram for illustrating a state of incidence of an object beam and an off-axis reference beam on a recording surface of an image sensor.

FIG. 5 is a schematic diagram showing a modification of the optical system in connection with a mask in the optical measurement system according to the first embodiment.

FIG. 6 is a flowchart showing a processing procedure in a measurement method using the optical measurement system according to the first embodiment.

FIG. 7 is a schematic diagram showing an exemplary configuration of an optical measurement system according to a modification of the first embodiment.

FIG. 8 is a schematic diagram showing an exemplary configuration of an optical measurement system according to a second embodiment.

FIG. 9 is a flowchart showing a processing procedure in a measurement method using the optical measurement system according to the second embodiment.

FIG. 10 is a schematic diagram showing an exemplary configuration of an optical measurement system according to a first modification of the second embodiment.

FIG. 11 is a schematic diagram showing an exemplary configuration of an optical measurement system according to a second modification of the second embodiment.

FIG. 12 is a schematic diagram showing an exemplary configuration of an optical measurement system according to a third modification of the second embodiment.

DESCRIPTION OF EMBODIMENTS

Figure 3:
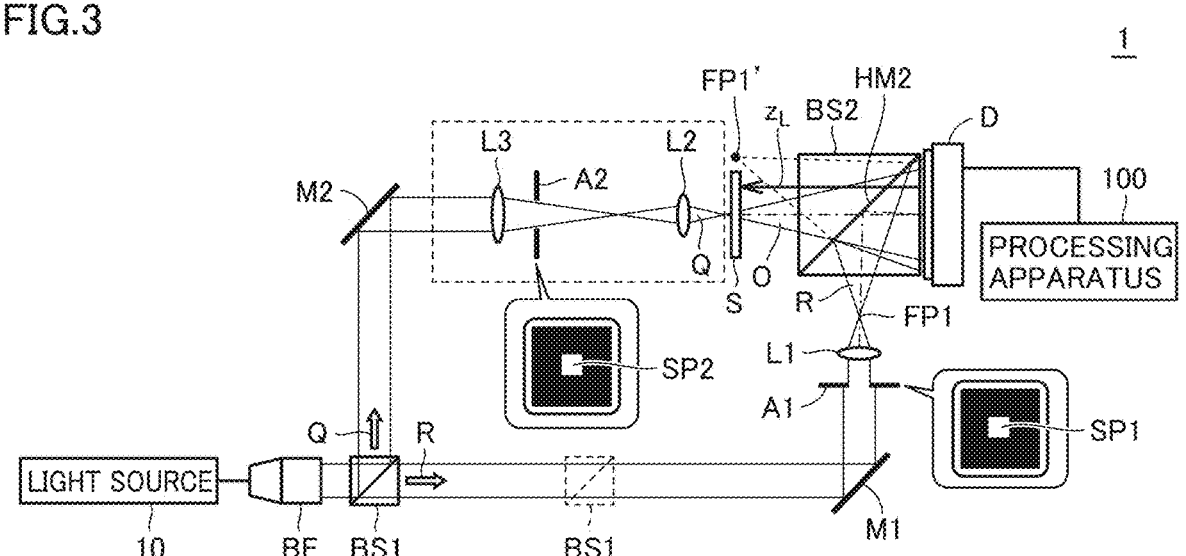
FIG. 3 is a diagram for illustrating relation of a sample and an off-axis reference beam in the optical measurement system according to the present embodiment.

An embodiment of the present invention will be described in detail with reference to the drawings. The same or corresponding elements in the drawings have the same reference characters allotted and description thereof will not be repeated.

A. Optical Measurement System

Initially, an optical measurement system according to the present embodiment makes use of digital holography where diverging light such as a point light source is used as a reference beam. In the present embodiment, an exemplary configuration based on lensless digital holography where there is no lens between a sample and an image sensor will be described.

In the description below, an optical measurement system where an off-axis holography optical system is adopted will mainly be described. In a first embodiment, a transmission optical system will be illustrated and a reflection optical system will be illustrated in a second embodiment and a modification thereof.

The optical measurement system according to the present embodiment measures a geometry of a sample. Furthermore, the optical measurement system according to the present embodiment can also measure an index of refraction of the sample. Though the optical measurement system can conduct measurement of any sample, it can be used for inspection of a surface of a semiconductor, measurement of a thickness or a distribution of indices of refraction of a film product, evaluation of surface roughness or an undulation of a precisely worked surface, and observation of a biological cell or evaluation of a shape thereof.

B. First Embodiment (b1: Optical System)

FIG. 1 is a schematic diagram showing an exemplary configuration of an optical measurement system 1 according to a first embodiment. FIG. 1 (A) shows an optical system in recording of an in-line reference beam and FIG. 1 (B) shows an optical system in recording of an object beam. Optical measurement system 1 can configure the optical systems shown in FIGS. 1 (A) and (B).

The optical system shown in FIG. 1 (A) falls under an optical system for recording an off-axis hologram $I_{LR}$ resulting from modulation of an in-line reference beam L with an off-axis reference beam R, in-line reference beam L serving as the reference of recording. The optical system shown in FIG. 1 (B) falls under an optical system for recording an off-axis hologram $I_{OR}$ resulting from modulation with off-axis reference beam R, of an object beam O obtained by illumination of a sample S with illumination light Q, off-axis reference beam R being diverging light. More specifically, the optical system shown in FIG. 1 (B) generates off-axis hologram $I_{OR}$ from transmitted light obtained by illumination of sample S with illumination light Q. An illumination light profile is also obtained with the use of the optical system shown in FIG. 1 (B). In this case, sample S is not arranged.

A processing apparatus 100 calculates a geometry or the like of sample S based on off-axis hologram $I_{LR}$ and off-axis hologram $I_{OR}$.

Referring to FIG. 1 (A), optical measurement system 1 includes a light source 10, a beam expander BE, beam splitters BS1 and BS2, mirrors M1 and M2, an objective lens MO, a pinhole P, a lens L1, a mask A1, and an image sensor D as the optical system for recording off-axis hologram $I_{LR}$.

Light source 10 is implemented by laser or the like, and generates coherent light. Beam expander BE expands a cross-sectional diameter of light from light source 10 to a predetermined size. Beam splitter BS1 divides light expanded by beam expander BE into two light beams. One light beam divided by beam splitter BS1 corresponds to in-line reference beam L (first light) and the other light beam corresponds to off-axis reference beam R (second light).

In-line reference beam L is reflected by mirror M2 and guided to beam splitter BS2. Furthermore, in-line reference beam L passes through a half mirror HM2 of beam splitter BS2 and is guided to image sensor D. Objective lens MO and pinhole P are arranged between mirror M2 and beam splitter BS2. In-line reference beam L is condensed by objective lens MO and narrowed in cross-sectional diameter by pinhole P. Pinhole P corresponds to a position of a point light source of in-line reference beam L. Objective lens MO and pinhole P implement the point light source of in-line reference beam L.

Off-axis reference beam R is reflected by mirror M1 and guided to beam splitter BS2. Furthermore, off-axis reference beam R is reflected by half mirror HM2 of beam splitter BS2 and guided to image sensor D. Mask A1 and lens L1 are arranged between mirror M1 and beam splitter BS2. Off-axis reference beam R passes through mask A1 and it is thereafter condensed by lens L1. A light condensation point FP1 which is a position of condensation of light corresponds to the position of the point light source of off-axis reference beam R. In other words, mask A1 and lens L1 implement the point light source of off-axis reference beam R.

Mask A1 is provided with an opening pattern SP1 in an area through which off-axis reference beam R passes. An image corresponding to opening pattern SP1 in mask A1 is formed on image sensor D. A size of opening pattern SP1 in mask A1 is determined such that an area out of a surface of beam splitter BS2 on a side of image sensor D is not irradiated with off-axis reference beam R that passes through mask A1. By thus determining the size of opening pattern SP1 in mask A1, generation of noise due to undue interference can be suppressed.

Off-axis reference beam R is adjusted such that in-line reference beam L can be recorded as a hologram.

In-line reference beam L and off-axis reference beam R are superimposed on each other by beam splitter BS2 arranged in a stage preceding image sensor D through optical paths as described above. In other words, image sensor D obtains off-axis hologram $I_{LR}$ resulting from modulation of in-line reference beam L with off-axis reference beam R which is diverging light.

Beam splitter BS2 is preferably formed in a cubic shape so as to facilitate arrangement thereof in the stage preceding image sensor D. The point light source of in-line reference beam L and the point light source of off-axis reference beam R are arranged in optical proximity to each other owing to beam splitter BS2.

Referring to FIG. 1 (B), optical measurement system 1 includes a mask A2 and lenses L2 and L3 instead of objective lens MO and pinhole P, as the optical system for recording off-axis hologram $I_{OR}$. Sample S to be measured is arranged between lens L2 and beam splitter BS2.

When a distance necessary for objective lens MO and pinhole P is longer than a distance necessary for objective lens MO and pinhole P in the optical system shown in FIG. 1 (A), beam splitter BS1 and mirror M2 are arranged at positions closer to light source 10.

Light outputted from one side of beam splitter BS1 is used as illumination light Q (first light) for illumination of sample S. In other words, illumination light Q divided by beam splitter BS1 is reflected by minor M2 and sample S is illuminated therewith. Object beam O (that is, light that has passed through sample S) obtained by illumination of sample S with illumination light Q passes through half mirror HM2 of beam splitter BS2 and is guided to image sensor D.

Lens L3, mask A2, and lens L2 are arranged in this order between minor M2 and beam splitter BS2.

Illumination light Q is condensed by lens L3 and passes through mask A2. Illumination light Q that passes through mask A2 is further condensed by lens L2 and forms an image on sample S.

Mask A2 corresponds to a restriction mechanism that restricts spread of light obtained by illumination of sample S with illumination light Q (first light) to be kept within a predetermined range. Such a mask A2 that an opening pattern SP2 corresponding to a predetermined range is formed in a shielding member may be employed as an exemplary restriction mechanism. Illumination light Q passes through an area corresponding to opening pattern SP2.

An image of opening pattern SP2 in mask A2 passes through lens L2 and is formed on sample S. In other words, of light with which mask A2 is illuminated, only light in a portion corresponding to opening pattern SP2 passes through mask A2. The range of illumination of sample S with illumination light Q that passes through mask A2 can thus be restricted. In other words, mask A2 representing an exemplary restriction mechanism restricts the range where sample S is illuminated with illumination light Q (first light) to a predetermined range. By restriction of the range of illumination with illumination light Q, unwanted light can be reduced and measurement accuracy can be enhanced.

Since the range of illumination may vary depending on a thickness of sample S in optical measurement system 1, for addressing such variation, opening pattern SP2 in mask A2 is changed or a position of lens L2 for forming an image of illumination light Q on sample S is changed as necessary.

When mirror M2 and mask A2 are arranged in optical proximity, lens L3 does not have to be provided.

Off-axis reference beam R (second light) outputted from the other side of beam splitter BS1 is guided to image sensor D through the optical path common to that in FIG. 1 (A).

(b2: Measurement Processing)

Processing for measuring a geometry of sample S in optical measurement system 1 according to the first embodiment will now be described. In the description below, a light receiving surface of image sensor D is defined as a "recording surface" and an intersection between the recording surface and a central optical axis of beam splitter BS2 is defined as the "origin". A direction of the optical axis is defined as a z axis and two axes orthogonal to the z axis are defined as an x axis and a y axis, respectively. In other words, the optical axis is perpendicular to the recording surface of image sensor D and the x axis and the y axis are in parallel to the recording surface of image sensor D, which is also similar in other embodiments.

Distributions of object beam O, off-axis reference beam R, and in-line reference beam L at the recording surface of image sensor D can be expressed in general expressions such as expressions (1) to (3) below.

$$L(x,y)=L_0(x,y)\exp[i(\varphi_L(x,y)-\omega t)] \tag{1}$$

$$O(x,y)=O_0(x,y)\exp[i(\varphi_O(x,y)-\omega t)] \tag{2}$$

$$R(x,y)=R_0(x,y)\exp[i(\varphi_R(x,y)-\omega t)] \tag{3}$$

In-line reference beam L, object beam O, and off-axis reference beam R are beams having angular frequencies ω coherent to one another. Off-axis hologram $I_{LR}$ recorded in the optical system shown in FIG. 1 (A) is calculated as in an expression (4) below, as light intensity of synthesized light of light expressed in the expression (3) and light expressed in the expression (1). Off-axis hologram $I_{OR}$ recorded in the optical system shown in FIG. 1 (B) is calculated as in an expression (5) below, as light intensity of synthesized light of light expressed in the expression (2) and light expressed in the expression (3).

$$I_{LR}(x, y) = \tag{4}$$

$$|L + R|^2 = L_0^2 + R_0^2 + L_0R_0\exp[i(\varphi_L - \varphi_R)] + L_0R_0\exp[-i(\varphi_L - \varphi_R)]$$

$$I_{OR}(x, y) = \tag{5}$$

$$|O + R|^2 = O_0^2 + R_0^2 + O_0R_0\exp[(i(\varphi_O - \varphi_R)] + O_0R_0\exp[(-i(\varphi_O - \varphi_R)]$$

Since off-axis hologram $I_{LR}$ is invariable regardless of a state of object beam O, it should only be recorded at least once.

In the expressions (4) and (5), the first term on the right side corresponds to an light intensity component of object beam O or in-line reference beam L, the second term on the right side corresponds to a light intensity component of off-axis reference beam R, the third term on the right side corresponds to a direct image component produced as a result of modulation of object beam O with off-axis reference beam R, and the fourth term on the right side corresponds to a conjugate image component.

As a result of application of a bandpass filter to the expressions (4) and (5) to extract the direct image component in the third term, a complex amplitude off-axis hologram $J_{LR}$ which is a record of in-line reference beam L and a complex amplitude off-axis hologram $J_{OR}$ which is a record of object beam O are calculated as in an expression (6) and an expression (7) below, respectively.

$$J_{LR}(x,y)=L_0R_0\exp[i(\varphi_L-\varphi_R)] \tag{6}$$

$$J_{OR}(x,y)=O_0R_0\exp[i(\varphi_O-\varphi_R)] \tag{7}$$

As a result of division of the expression (7) by the expression (6), a component of off-axis reference beam R is eliminated and a complex amplitude in-line hologram $J_{OL}$ with in-line reference beam L being defined as the reference is calculated as in an expression (8) below.

$$J_{OL}(x, y) = \frac{O_0}{L_0}\exp[i(\varphi_0 - \varphi_L)] \tag{8}$$

A component of in-line reference beam L can be eliminated by multiplying complex amplitude in-line hologram $J_{OL}$ shown in the expression (8) by in-line reference beam L. A method described in WO2020/045584 (PTL 5) can be adopted as a method of calculating in-line reference beam L. Through processing above, an object beam hologram U as shown in an expression (9) below is obtained.

$$U(x,y)=J_{OL}L=O_0\exp(i\varphi_O(x,y)) \tag{9}$$

When object beam hologram U includes a frequency component that does not satisfy a sampling theorem, correction processing as below is applied to generate a hologram including information from which a state of a position of interest can be reconstructed. A hologram including information from which a state of a position of interest can be reconstructed is defined as a reconstruction object beam hologram $U_\Sigma$. When object beam hologram U satisfies the sampling theorem, object beam hologram U is adopted as it is as reconstruction object beam hologram $U_\Sigma$.

By way of example of correction processing, before elimination of in-line reference beam L, the number of sampling points that form an image outputted from image sensor D may be increased by interpolation. Alternatively, a pitch between pixels of image sensor D may be subdivided by application of a division and superimposition step disclosed in WO2020/045584 (PTL 5). By using the division and superimposition step, an amount of computation can be reduced.

By diffraction calculation by plane wave expansion onto reconstruction object beam hologram $U_\Sigma$, a distribution of optical waves at any position can be reconstructed. A hologram resulting from propagation over a distance d of reconstruction object beam hologram $U_\Sigma$ (at a position distant from the recording surface by distance d) by plane wave expansion is denoted as $U_d$.

Hologram $U_d$ can be generalized as in an expression (10) below, where d represents a distance from the light receiving surface (recording surface) of image sensor D to a position at which reconstruction is desired, within which M media (m=1, 2, . . . , M) are included, $d_m$ represents a distance of each medium, and $n_m$ represents an index of refraction of each medium. $k_{zm}$ in the expression is calculated in accordance with an expression (11).

$$U_d(x, y) = F^{-1}\left[F[U_\Sigma(x, y)]\prod_{m=1}^{M} T_{m,m+1}\exp(ik_{zm}d_m)\right] \tag{10}$$

$$k_{zm} = \sqrt{\left(\frac{2\pi n_m}{\lambda}\right)^2 - k_x^2 - k_y^2} \tag{11}$$

When there are a plurality of media, a boundary surface between the media is assumed as being in parallel to the recording surface. A transmission coefficient at the time of incidence from a medium m into a medium m+1 is expressed as $T_{m, m+1}(k_x, k_y)$. $T_{m, m+1}(k_x, k_y)$ is regarded as being always 1.

For example, in the case of propagation only through air by distance d, a condition of M=1, $d_1$=d, and $n_m$=1 is set.

When the transmission coefficient at the time of incidence from medium m into medium m+1 can be regarded as being even without depending on wave numbers $k_x$ and $k_y$, calculation may be simplified with $T_{m, m+1}$ being defined as $T_{m, m+1}\equiv 1$.

(b3: Restriction Mechanism)

In order to apply the bandpass filter to the expressions (5) and (4) to extract the direct image component in the third term, in a spatial frequency band, the direct image component should not be superimposed on the light intensity component and the conjugate image component. In the present embodiment, the restriction mechanism such as mask A2 restricts spread of object beam O obtained by illumination of sample S with illumination light Q to prevent deterioration of the image due to superimposition of the spatial frequency band.

While a degree of freedom of an illumination method is maintained by formation on sample S, of an image of opening pattern SP2 in mask A2 arranged at a position distant from sample S, a spatial frequency bandwidth included in interference fringes is appropriately controlled to efficiently make use of the spatial frequency bandwidth within which image sensor D can make recording.

In optical measurement system 1, mask A1 and lens L1 implement the point light source of off-axis reference beam R. A spatial frequency f of interference fringes at any point on the recording surface can be expressed with an angle of incidence $\theta_O$ of object beam O at that point and an angle of incidence $\theta_R$ of off-axis reference beam R, as shown in an expression (12) below.

$$f = \frac{\sin\theta_O - \sin\theta_R}{\lambda} \cong \frac{\theta_O - \theta_R}{\lambda} \qquad (12)$$

FIG. 2 is a diagram for illustrating a state of incidence of object beam O and off-axis reference beam R on the recording surface of image sensor D. FIG. 2 (A) shows an example where off-axis reference beam R is a plane wave and FIG. 2 (B) shows an example where off-axis reference beam R is a spherical wave.

Referring to FIG. 2 (A), when off-axis reference beam R is a plane wave, an angle formed at any point on the recording surface of image sensor D by object beam O and off-axis reference beam R is dependent on a position on the recording surface of image sensor D. For example, an angle $\alpha$ formed at an upper end of the recording surface of image sensor D by object beam O and off-axis reference beam R and an angle $\beta$ formed at a lower end of the recording surface thereby are greatly different from each other.

In contrast, referring to FIG. 2 (B), when off-axis reference beam R is a spherical wave, an angle formed at one point on the recording surface of image sensor D by object beam O and off-axis reference beam R is not dependent on the position on the recording surface but has substantially the same value. For example, angle $\alpha$ formed at the upper end of the recording surface of image sensor D by object beam O and off-axis reference beam R is substantially the same as angle $\beta$ formed at the lower end of the recording surface thereby.

In other words, by providing off-axis reference beam R from the point light source, an angle formed between a light beam (object beam O) generated from any point of sample S and a light beam generated from the point light source of off-axis reference beam R can substantially be constant at any point on the recording surface.

When object beam O is regarded as a set of wave sources located on the same z plane where the point light source of off-axis reference beam R is located, relation shown in an expression (13) below is approximately satisfied between a position $(x_s, y_s)$ of the wave source on the z plane and a corresponding spatial frequency $(u_s, v_s)$.

$$u_s = \frac{x_s}{z_L\lambda}, \quad v_s = \frac{y_s}{z_L\lambda} \qquad (13)$$

$z_L$ in the expression represents a distance in the direction of the z axis from the point light source of off-axis reference beam R to the recording surface and $\lambda$ represents a wavelength. The spatial frequency in the x direction is denoted as u and the spatial frequency in the y direction is denoted as v.

As shown in the expression (13), it can be seen that the position of the wave source (object beam O) on the z plane and the spatial frequency (a coordinate of a spectral component) satisfy approximately linear relation. Therefore, spread of the spatial frequency band of the direct image component can be controlled by restriction of an area where the wave source (object beam O) is present. The spatial frequency band can thus efficiently be made use of.

The "area where the wave source is present" means a range where sample S is illuminated. In other words, the range of illumination can be restricted by optimization of opening pattern SP2 in mask A2 and thus the spatial frequency band can appropriately be controlled. Since mask A2 serves to simply restrict the range of illumination of sample S, it does not cause distortion of a reconstructed sample image so long as a complex amplitude of object beam O is correctly recorded.

A method of determining a size of opening pattern SP2 in mask A2 will now be described.

As described above, off-axis hologram km recorded in the optical system shown in FIG. 1 (B) is calculated as in the expression (5). In the expression (5), the component necessary for reconstruction of the image is the direct image component in the third term and other terms are superimposed as noise components. Therefore, other terms should be removed by the bandpass filter.

A coordinate of the origin of image sensor D is expressed as (0, 0, 0) and a coordinate of the center of sample S is expressed as $(0, 0, z_L)$.

FIG. 3 is a diagram for illustrating relation of sample S and off-axis reference beam R in the optical measurement system according to the present embodiment. Referring to FIG. 3, a coordinate of the point light source (a light condensation point FP1') resulting from expansion of the point light source (a light condensation point FP1) of off-axis reference beam R on the side of sample S with respect to half mirror HM2 of beam splitter BS2 is expressed as $(x_R, y_R, z_R, =z_L)$ and the range of illumination of sample S is defined as a rectangle having a size of a in the x direction and b in the y direction. Then, a bandwidth $W_x$ in a u direction and a bandwidth $W_y$ in a v direction of the direct image component in the third term can approximately be expressed as in an expression (14) below, and a central frequency $u_c$ in the u direction and a central frequency $v_c$ in the v direction can approximately be expressed as in an expression (15) below.

$$W_x = \frac{a}{z_L\lambda}, \quad W_y = \frac{b}{z_L\lambda} \qquad (14)$$

$$u_c = \frac{x_R}{z_L\lambda}, \quad v_c = \frac{y_R}{z_L\lambda}$$

A bandwidth $W_x$ in the u direction of the conjugate image component (the fourth term) and a bandwidth $W_y$ in the v direction thereof can also approximately be expressed as in the expression (14) above. Central frequency $u_c$ in the u direction and central frequency $v_c$ in the v direction of the conjugate image component (the fourth term) are expressed, with signs in the expression (15) above being inverted.

A bandwidth of a component calculated by combining the light intensity component in the first term and the light intensity component in the second term spreads over a size twice as large as that expressed in the expression (14) with the origin being defined as the center.

Figure 4:
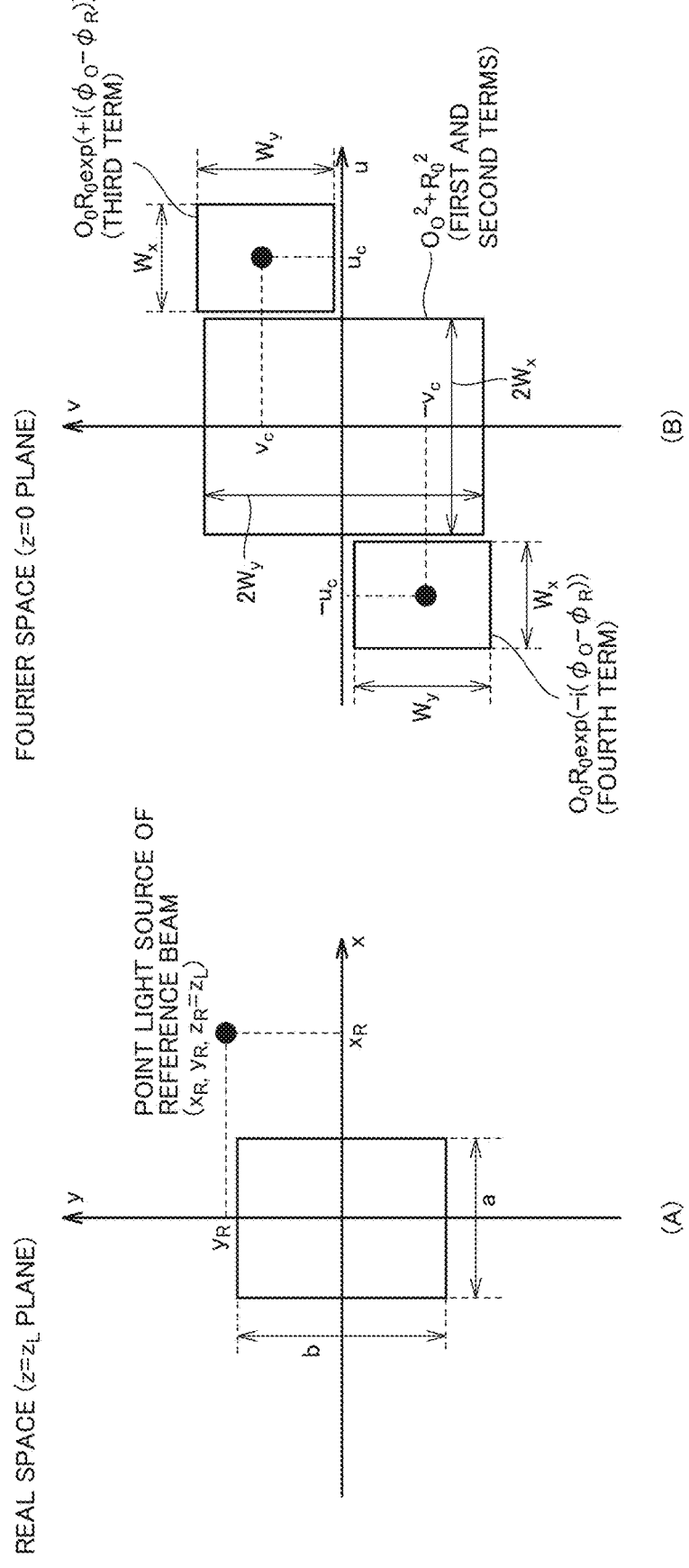
FIG. 4 is a diagram for illustrating relation of a spatial frequency band in connection with an off-axis hologram in the optical measurement system according to the present embodiment.

Relation above can be shown as in FIG. 4.

FIG. 4 is a diagram for illustrating relation of a spatial frequency band in connection with an off-axis hologram in the optical measurement system according to the present embodiment. FIG. 4 (A) shows a position of off-axis reference beam R and a range of illumination of sample S on a $z=z_L$ plane in a real space. FIG. 4 (B) shows a spectrum resulting from two-dimensional Fourier transform of the hologram recorded on the recording surface (z=0).

Referring to FIG. 4 (A), in the real space, sample S is present in a size of a×b with the coordinate (0, 0, $z_L$) being defined as the center. The point light source of off-axis reference beam R is present at a position distant by $x_R$ in the x direction and $y_R$ in the y direction from the coordinate (0, 0, $z_L$).

Referring to FIG. 4 (B), in a Fourier space (a spatial frequency domain), the direct image component in the third term including information on object beam O spreads over a size of a bandwidth $W_x \times W_y$, and the central frequency of the direct image component is determined depending on a coordinate ($x_R$, $y_R$) of the point light source of off-axis reference beam R.

In order to extract only the third term (direct image component) including information on object beam O from a spectrum in the Fourier space shown in FIG. 4 (B) with the use of the bandpass filter, superimposition on components in other terms (the first term, the second term, and the fourth term) should be avoided.

On the other hand, since the spatial frequency band of image sensor D is limited, it is not preferable to set excessively high central frequencies $u_c$ and $v_c$. Therefore, in order to efficiently make use of the spatial frequency band of image sensor D, the component in the third term should be brought closer to the limit up to which it is not superimposed on components in other terms (the first term, the second term, and the fourth term).

In order to arrange the bands as being proximate to one another, the spatial frequency bandwidth is restricted to be kept within an appropriate range. When the off-axis reference beam is diverging light (point light source), relation in the expression (5) above is satisfied. Therefore, by restriction of the range of illumination with illumination light Q, the spatial frequency bandwidth of each component can be restricted to be kept within an appropriate range.

The size of the range of illumination of sample S with illumination light Q is thus determined such that the component (the third term) corresponding to illumination light Q (first light) is not superimposed on components (the first term and the second term) other than the component corresponding to illumination light Q in the Fourier space (spatial frequency domain) of the hologram recorded with image sensor D.

By restriction of the spatial frequency bandwidth of each component to be kept within the appropriate range, the spatial frequency band of image sensor D can efficiently be made use of and noise caused by superimposition of the spatial frequency band can also be suppressed.

Though application to the off-axis holography optical system is described, mask A2 described above is effective also in restriction of the spatial frequency bandwidth of the direct image component to be kept within a range within which recording with image sensor D can be made, also in an optical system adapted to another holography where diverging light (that is, the point light source or a light source that can be regarded as the point light source) is employed as a reference beam.

Mask A2 used in the optical measurement system according to the present embodiment may be similar in outer geometry to a field stop used in an optical microscope. The field stop, however, is used for the purpose of suppression of stray light caused by impingement of needless light (light out of the field of view) on a wall in an optical path. Though the noise level can be lowered by the field stop, little stray light is suppressed. Therefore, unless detection of weak light is aimed at, no great problem will arise without taking positive measures.

In contrast, restriction of the range of illumination in digital holography where diverging light is adopted as the reference beam is effective for restriction of the spatial frequency bandwidth included in interference fringes to be kept within the range within which recording with image sensor D can be made. Mask A2 used in the optical measurement system according to the present embodiment is used for this purpose.

Mask A2 used in the optical measurement system according to the present embodiment thus exhibits an effect different from the effect exhibited by the field stop used in the optical microscope.

Though use of mask A2 provided with opening pattern SP2 of a predetermined size as an exemplary restriction mechanism is illustrated in the description above, without being limited as such, the restriction mechanism may be implemented by any optical element.

For example, the size of the opening pattern (a cross-sectional area within which illumination light passes) may freely be changed with the use of an optical element capable of controlling a transmittance of light such as a polarization mirror or liquid crystal. As the size of the opening pattern can freely be changed, change in distance between sample S and image sensor D or change in position of the point light source of the off-axis reference beam can readily be addressed.

(b4: Modification of Optical System in Connection with Mask A2)

Instead of the configuration as shown in FIG. 1, an optical system as below may be adopted as the optical system for forming an image of opening pattern SP2 in mask A2 on sample S.

FIG. 5 is a schematic diagram showing a modification of the optical system in connection with mask A2 in optical measurement system 1 according to the first embodiment.

Referring to FIG. 5 (A), lenses L31 and L32 instead of lens L3 shown in FIG. 1 (B) may be arranged. Specifically, in the optical system shown in FIG. 5 (A), illumination light Q sequentially passes through minor M2, lens L31, lens L32, mask A2, and lens L2 and forms an image on sample S. Lens L31 and lens L32 implement an image forming optical system 20 such as a 4f optical system.

An image of light that passes through opening pattern SP2 in mask A2 is formed on sample S in a shape the same as the shape of opening pattern SP2.

FIG. 5 (B) shows an exemplary optical system when illumination light Q for illumination of sample S is parallel light. More specifically, in the optical system shown in FIG. 5 (B), instead of lens L2 of the optical system shown in FIG. 5 (A), a lens L21 and a lens L22 are arranged. Lens L21 and lens L22 are each a condensing lens, and by combination of the lenses, sample S is illuminated with illumination light Q that passes through mask A2 while illumination light Q remains as parallel light.

The optical system arranged in each of stages preceding and subsequent to mask A2 is not limited to the optical system shown in one of FIG. 1 (B) and FIGS. 5 (A) and (B). Any feature may be adopted as the optical system to be arranged in the stage preceding mask A2 so long as reflected light from minor M2 can be projected to cover opening pattern SP2 in mask A2. Any feature may be adopted as the optical system to be arranged in the stage subsequent to mask A2 so long as an image of opening pattern SP2 in mask A2 can be formed on sample S. So long as such a requirement is satisfied, the number of lenses and a type of the lens can freely be designed. Without being limited to the lens, any optical device may be used for implementation.

(b5: Measurement of Geometry of Sample Using Information on Phase of Object Beam)

A method of measuring a geometry of sample S with the use of optical measurement system 1 according to the first embodiment will now be described. An amount of phase shift caused by the sample is used for measurement of a geometry of sample S.

A distribution of optical waves obtained by propagation of reconstruction object beam hologram $U_\Sigma$ to a sample plane by plane wave expansion through the procedure as described above is defined as an object beam distribution $U_S$. A phase distribution of object beam distribution $U_S$ is obtained by adding an amount of phase shift $\Delta\theta$ caused by sample S to a phase distribution $\theta_Q$ of illumination light Q.

Though change in distance from the recording surface to the sample plane is also assumed in the case of measurement with sample S successively being replaced, it is not necessary to record illumination light Q (illumination light profile) each time the distance changes. By diffraction calculation, illumination light Q at another distance can be calculated from illumination light Q at the sample plane distant from the recording surface by a certain distance.

When sample S includes a substrate which is not an object to be measured, a profile of illumination light that passes through the substrate can be calculated by performing on illumination light Q (illumination light profile), calculation of propagation within a medium by plane wave expansion. In this case, when approximate thickness and index of refraction of the substrate have already been known, a sample consisting only of the substrate should be prepared other than sample S, and illumination light Q does not have to be recorded.

A layer of sample S other than the substrate can be measured with the use of the calculated profile of illumination light that passes through the substrate. When recording only in connection with the substrate can be made, by recording of illumination light that passes through the substrate while the substrate alone is arranged, calculation of propagation within the medium in the substrate can also be omitted.

In order to extract only amount of phase shift $\Delta\theta$ caused by sample S from the phase distribution of object beam distribution $U_S$, information on illumination light Q is required. In the optical measurement system according to the present embodiment, illumination light Q (illumination light profile) recorded while no sample S is arranged is used to subtract phase distribution $\theta_Q$ of illumination light from the phase distribution of object beam distribution $U_S$ to thereby calculate amount of phase shift $\Delta\theta$ caused by sample S.

Processing for subtracting phase distribution $\theta_Q$ of illumination light from the phase distribution of object beam distribution $U_S$ can be performed by calculating an amplitude phase distribution $U_P$ at the sample plane by dividing object beam distribution $U_S$ of a complex amplitude by illumination light Q and calculating an angle of deviation of calculated amplitude phase distribution $U_P$.

Optical measurement system 1 according to the first embodiment measures the geometry of sample S with the use of a relational expression of amount of phase shift $\Delta\theta$ caused by sample S and a thickness $\Delta d$ of sample S shown in an expression (16) below.

$$\Delta\theta = \Delta d(k_{z2} - k_{z1}) + \delta \tag{16}$$

$k_{z1}$ in the expression represents a wave number in the z direction in sample S, $k_{z2}$ represents a wave number in the z direction in the medium where sample S is present, $\delta$ represents a phase correction term, and $\lambda$ represents a light source wavelength. Wave numbers $k_{z1}$ and $k_{z2}$ can be calculated in accordance with an expression (17) and an expression (18) below, respectively.

$$k_{z1} = \sqrt{\left(\frac{2\pi n_1}{\lambda}\right)^2 - k_x^2 - k_y^2} \tag{17}$$

$$k_{z2} = \sqrt{\left(\frac{2\pi n_2}{\lambda}\right)^2 - k_x^2 - k_y^2} \tag{18}$$

$n_1$ in the expression represents an index of refraction of a medium where sample S is present and $n_2$ represents an index of refraction of sample S. For example, when sample S is present in vacuum, an index of refraction $n_1$ is set to $n_1 = 1$.

Since wave number $k_x$ in the x direction and wave number $k_y$ in the y direction in the expression represent amounts of phase shift per unit length in the x direction and the y direction, they can be calculated by differentiation of phase distribution $\theta_Q$ of illumination light at the sample plane as shown in an expression (19) and an expression (20) below.

$$k_x(x, y) = \frac{\partial}{\partial x} \theta_Q(x, y) \tag{19}$$

$$k_y(x, y) = \frac{\partial}{\partial y} \theta_Q(x, y) \tag{20}$$

Phase correction term $\delta$ in the expression (16) is used for correction of phase shift due to a complex transmittance when the transmittance attains to a complex number for such a reason as light absorption by sample S. When phase shift due to the complex transmittance can be regarded as being even in the entire sample S for such a reason that sample S is entirely of the same material, phase correction term $\delta$ may be omitted.

When the coordinate of the point light source of illumination light is displaced by disturbance, illumination light Q may be corrected by translation of pixels on image sensor D. An amount of translation is typically determined to maximize correlation between object beam distribution $U_S$ and illumination light Q.

When a shape of a wave front of illumination light is smooth, an amount of information may be reduced by using a low-pass filter or polynomial approximation.

(b6: Processing Procedure)

FIG. 6 is a flowchart showing a processing procedure in a measurement method using optical measurement system 1 according to the first embodiment. The processing procedure shown in FIG. 6 is an optical measurement method using the optical system including beam splitter BS1 that divides light from light source 10 into first light and second light.

Referring to FIG. 6, initially, processing for obtaining in-line reference beam L is performed. More specifically, the optical system shown in FIG. 1 (A) is set up (step S2). Coherent light is generated from light source 10 and processing apparatus 100 obtains off-axis hologram $I_{LR}$ resulting from modulation of in-line reference beam L recorded with image sensor D with off-axis reference beam R (step S4). Unless the optical system associated with off-axis reference beam R is modified, steps S2 and S4 should only be performed once. Processing in steps S2 and S4 is performed for the purpose of improvement in accuracy of a reconstructed image, and depending on required accuracy, processing in steps S2 and S4 may be skipped.

In succession, processing for obtaining an illumination light profile is performed. More specifically, the optical system shown in FIG. 1 (B) is set up (step S6). At this time, a state where there is no sample S is maintained. A substrate equal in thickness to the substrate of sample S may be arranged at a position where sample S is arranged (sample position), or nothing can be arranged at the sample position. This state corresponds to the reference in measurement. Coherent light is then generated from light source 10 and processing apparatus 100 obtains illumination light hologram Q(x, y) recorded with image sensor D (step S8). Processing apparatus 100 thus records with image sensor D, a hologram resulting from modulation with off-axis reference beam R, of light obtained by illumination with illumination light Q while there is no sample S. Alternatively, processing apparatus 100 records with image sensor D, a hologram from transmitted light obtained by illumination with illumination light Q, of a substrate instead of sample S, the substrate not being an object to be measured included in sample S.

Processing apparatus 100 calculates a reconstruction illumination light hologram (illumination light profile $Q_{\Sigma}(x, y)$) from illumination light hologram Q(x, y) (step S10).

Processing for obtaining a phase amplitude distribution of sample S is then performed. More specifically, sample S is arranged at a predetermined position of the optical system shown in FIG. 1 (B) (step S12). Then, coherent light is generated from light source 10 and processing apparatus 100 obtains an object beam hologram U(x, y) recorded with image sensor D (step S14). Processing apparatus 100 thus performs processing for recording with image sensor D, off-axis hologram $I_{OR}$ resulting from modulation with off-axis reference beam R (second light), of light obtained by illumination of sample S with illumination light Q (first light). At this time, as described above, the restriction mechanism (mask A2) is used to restrict spread of light obtained by illumination of sample S with illumination light Q to be kept within a predetermined range.

Processing apparatus 100 thereafter performs processing for calculating a geometry of sample S based on off-axis hologram $I_{LR}$ and off-axis hologram $I_{OR}$.

Initially, processing for reconstructing a hologram is performed as calculation processing. More specifically, processing apparatus 100 calculates reconstruction object beam hologram $U_{\Sigma}(x, y)$ from object beam hologram U(x, y) (step S16). Processing apparatus 100 then has illumination light profile $Q_{\Sigma}(x, y)$ and reconstruction object beam hologram $U_{\Sigma}(x, y)$ propagate to a position of the sample plane by plane wave expansion and calculates illumination light distribution $Q_S(x, y)$ and object beam distribution $U_S(x, y)$ at the sample plane (step S18).

Processing for calculating the amplitude phase distribution is then performed. More specifically, processing apparatus 100 calculates amplitude phase distribution $U_P(x, y)$ at the sample plane by dividing object beam distribution $U_S(x, y)$ by illumination light distribution $Q_S(x, y)$ (step S20).

Processing for calculating an object beam phase is then performed. More specifically, processing apparatus 100 calculates amount of phase shift $\Delta\theta(x, y)$ from an angle of deviation of amplitude phase distribution $U_P(x, y)$ at the sample plane (step S22).

Processing for calculating a thickness of sample S is then performed. More specifically, processing apparatus 100 calculates a thickness $\Delta d(x, y)$ of sample S based on an amount of phase shift $\Delta\theta(x, y)$ (step S24). A relational expression shown in the expression (16) above is used for thickness $\Delta d$ of sample S.

Finally, processing apparatus 100 calculates a geometric profile of sample S by aggregating thicknesses $\Delta d(x, y)$ at coordinates in the sample plane (step S26).

The geometry of sample S can be calculated through processing as above.

An index of refraction and a profile of the index of refraction of sample S can also be measured. In this case, an index of refraction $n_2(x, y)$ of sample S is calculated in step S24 and the profile of the index of refraction of sample S is calculated by aggregating indices of refraction $n_2(x, y)$ at coordinates in the sample plane in step S26.

C. Modification of First Embodiment

A modification of the optical system in optical measurement system 1 according to the first embodiment will be exemplified.

FIG. 7 is a schematic diagram showing an exemplary configuration of an optical measurement system 1A according to the modification of the first embodiment. FIG. 7 (A) shows an optical system in recording of an in-line reference beam and FIG. 7 (B) shows an optical system in recording of an object beam. Optical measurement system 1A can configure the optical systems shown in FIGS. 7 (A) and (B).

Since the optical system shown in FIG. 7 (A) is the same as the optical system in recording of the in-line reference beam in optical measurement system 1 according to the first embodiment shown in FIG. 1 (A), detailed description thereof will not be repeated.

The optical system shown in FIG. 7 (B) is different from the optical system in recording of the object beam in optical measurement system 1 according to the first embodiment shown in FIG. 1 (B) in position where mask A2 is arranged. More specifically, mask A2 is arranged on the optical path from sample S to image sensor D. In the optical system shown in FIG. 7 (B), mask A2 is arranged at a position adjacent to sample S.

Object beam O obtained by illumination of sample S with illumination light Q passes through mask A2 and is guided to image sensor D. Mask A2 thus corresponds to the restriction mechanism that restricts spread of light (object beam O) obtained by illumination of sample S with illumination light Q (first light) to be kept within a predetermined range.

In the optical system shown in FIG. 7 (B), mask A2 representing an exemplary restriction mechanism restricts the range where object beam O obtained by illumination of sample S with illumination light Q passes to the predetermined range. By restriction of spread of object beam O, unwanted light can be reduced and measurement accuracy can be enhanced.

Since details of mask A2 have been described above, description thereof will not be repeated. The opening pattern should only be designed as appropriate depending on a position where mask A2 is arranged.

Since the processing procedure or the like is similar to that in the first embodiment, detailed description thereof will not be repeated.

D. Second Embodiment (d1: Optical System)

FIG. 8 is a schematic diagram showing an exemplary configuration of an optical measurement system 2 according to a second embodiment. FIG. 8 (A) shows an optical system in recording of an in-line reference beam and FIG. 8 (B) shows an optical system in recording of an object beam. Optical measurement system 2 can configure the optical systems shown in FIGS. 8 (A) and (B).

Since the optical system shown in FIG. 8 (A) is the same as the optical system in recording of the in-line reference beam in optical measurement system 1 according to the first embodiment shown in FIG. 1 (A), detailed description thereof will not be repeated.

The optical system shown in FIG. 8 (B) corresponds to the optical system for recording of off-axis hologram $I_{OR}$ resulting from modulation with off-axis reference beam R, of object beam O obtained by illumination of sample S with illumination light Q. More specifically, the optical system shown in FIG. 8 (B) generates off-axis hologram $I_{OR}$ from reflected light obtained by illumination of sample S with illumination light Q. An illumination light profile is also obtained with the use of the optical system shown in FIG. 8 (B). In this case, a reference plane instead of sample S is arranged as will be described later.

The optical system shown in FIG. 8 (B) is different from the optical system in recording of the object beam in optical measurement system 1 according to the first embodiment shown in FIG. 1 (B) in configuration for illumination of sample S with illumination light Q. Therefore, off-axis reference beam R outputted from the other side of beam splitter BS1 is guided to image sensor D through the optical path common to that in FIGS. 1 (A) and (B) and 8 (A).

Light outputted from one side of beam splitter BS1 is used as illumination light Q for illumination of sample S.

More specifically, illumination light Q divided by beam splitter BS1 is reflected by mirror M2 and minor M3, thereafter passes through lens L3, mask A2, and a lens L4, and is guided to beam splitter BS2. Illumination light Q is further reflected by half minor HM2 of beam splitter BS2 and sample S is illuminated therewith. Object beam O obtained by illumination of sample S with illumination light Q (that is, light reflected by sample S) passes through half minor HM2 of beam splitter BS2 and is guided to image sensor D.

Mirror M3, lens L3, mask A2, and lens L4 are arranged in this order between minor M2 and beam splitter BS2. As in the first embodiment, illumination light Q is condensed by lens L3 and passes through mask A2. Illumination light Q that passes through mask A2 is further condensed by lens L4 and an image thereof is formed on sample S. In other words, an image of opening pattern SP2 in mask A2 passes through lens L4 and is formed on sample S. The range within which sample S is illuminated with illumination light Q that passes through mask A2 can thus be restricted. By restriction of the range of illumination with illumination light Q, unwanted light can be reduced and measurement accuracy can be enhanced.

Since the range of illumination may vary depending on the thickness of sample S also in optical measurement system 2, for addressing such variation, opening pattern SP2 in mask A2 is changed or a position of lens L4 for formation of an image of illumination light Q on sample S is changed as necessary.

When mirror M2 and mask A2 are arranged in optical proximity, lens L3 does not have to be provided.

(d2: Measurement Processing)

Processing for measuring a geometry of sample S in optical measurement system 2 according to the second embodiment will now be described.

Relation between amount of phase shift $\Delta\theta$ caused by sample S and a height $\Delta h$ of sample S is as shown in an expression (21) below.

$$\Delta\theta = 2k_z \Delta h + \delta \tag{21}$$

$k_z$ in the expression represents a wave number in the z direction and $\delta$ represents a phase correction term.

Wave number $k_x$ and wave number $k_y$ can be calculated in accordance with the expressions (19) and (20) described above. Phase correction term $\delta$ may also be omitted when phase shift caused by a complex reflectivity can be regarded as being even in the entire sample S for such a reason that sample S is entirely made of the same material.

An illumination light profile in optical measurement system 2 will now be described. In a reflection optical system adopted in optical measurement system 2, a reference plane is arranged at a position where sample S is to be arranged (sample position) and reflected light from the reference plane is used as illumination light Q. The reference plane is preferably a plane, and for example, optical flat can be employed. In other words, the optical system shown in FIG. 8 (B) obtains the illumination light profile from reflected light obtained by illumination with illumination light Q, of the reference plane arranged at a position where sample S is to be arranged.

Since illumination light distribution $Q_S$ at the sample plane different in distance can be calculated by propagation of recorded illumination light Q, illumination light Q does not have to be recorded each time the distance from the recording surface changes as in the first embodiment (transmission optical system). When the coordinate of the point light source of illumination light is displaced due to disturbance, illumination light Q may be corrected by translation of pixels on image sensor D.

A plurality of beams of illumination light may be recorded while the reference plane is translated in the x direction and the y direction for the purpose of elimination of an error in geometry included in the reference plane, and an average value of the plurality of recorded beams of illumination light may be adopted as illumination light Q.

In measurement of a geometry (in-plane profile) over the entire sample plane, an optical system (see, for example, FIG. 5 (B)) where illumination light Q is parallel light may be adopted. When illumination light Q is a spherical wave, focus displacement with respect to the sample plane may be detected as a false geometry in a concave or convex shape. Such a false geometry is caused by the fact that illumination light is a spherical wave. Therefore, in measurement of the geometry (in-plane profile) over the entire sample plane, the optical system in which illumination light Q is parallel light is preferably adopted.

(d3: Processing Procedure)

FIG. 9 is a flowchart showing a processing procedure in a measurement method using optical measurement system 2 according to the second embodiment. The processing procedure shown in FIG. 9 is an optical measurement method using the optical system including beam splitter BS1 that divides light from light source 10 into first light and second light.

Referring to FIG. 9, initially, processing for obtaining in-line reference beam L is performed. More specifically, the optical system shown in FIG. 8 (A) is set up (step S52). Coherent light is then generated from light source 10 and processing apparatus 100 obtains off-axis hologram $I_{LR}$ resulting from modulation with off-axis reference beam R, of in-line reference beam L recorded with image sensor D (step S54). Unless the optical system associated with off-axis reference beam R is modified, steps S52 and S54 should only be performed once. Processing in steps S52 and S54 is performed for the purpose of improvement in accuracy of the reconstructed image, and depending on required accuracy, processing in steps S52 and S54 may be skipped.

In succession, processing for obtaining an illumination light profile is performed. More specifically, the optical system shown in FIG. 8 (B) is set up (step S56). At this time, sample S is not arranged but the reference plane is arranged at a position where sample S is to be arranged (sample position). This state corresponds to the reference in measurement. Coherent light is then generated from light source 10 and processing apparatus 100 obtains illumination light hologram Q(x, y) recorded with image sensor D (step S58). Processing apparatus 100 thus records with image sensor D, a hologram resulting from modulation with off-axis reference beam R, of light obtained by illumination of the reference plane instead of sample S with illumination light Q.

Processing apparatus 100 calculates a reconstruction illumination light hologram (illumination light profile $Q_\Sigma(x, y)$) from illumination light hologram Q(x, y) (step S60).

Processing for obtaining a phase amplitude distribution of sample S is then performed. More specifically, sample S is arranged at a predetermined position of the optical system shown in FIG. 8 (B) (step S62). Then, coherent light is generated from light source 10 and processing apparatus 100 obtains object beam hologram U(x, y) recorded with image sensor D (step S64). Processing apparatus 100 thus performs processing for recording with image sensor D, off-axis hologram $I_{OR}$ resulting from modulation with off-axis reference beam R (second light), of light obtained by illumination of sample S with illumination light Q (first light). At this time, as described above, the restriction mechanism (mask A2) is used to restrict spread of light obtained by illumination of sample S with illumination light Q to be kept within a predetermined range.

Processing apparatus 100 thereafter performs processing for calculating a geometry of sample S based on off-axis hologram $I_{LR}$ and off-axis hologram $I_{OR}$.

Initially, processing for reconstructing a hologram is performed as calculation processing. More specifically, processing apparatus 100 calculates reconstruction object beam hologram $U_\Sigma(x, y)$ from object beam hologram U(x, y) (step S66). Processing apparatus 100 then has illumination light profile $Q_\Sigma(x, y)$ and reconstruction object beam hologram $U_\Sigma(x, y)$ propagate to a position of the sample plane by plane wave expansion and calculates illumination light distribution $Q_S(x, y)$ and object beam distribution $U_S(x, y)$ at the sample plane (step S68).

Processing for calculating an amplitude phase distribution is then performed. More specifically, processing apparatus 100 calculates amplitude phase distribution $U_P(x, y)$ at the sample plane by dividing object beam distribution $U_S(x, y)$ by illumination light distribution $Q_S(x, y)$ (step S70).

Processing for calculating an object beam phase is then performed. More specifically, processing apparatus 100 calculates amount of phase shift $\Delta\theta$ from an angle of deviation of amplitude phase distribution $U_P(x, y)$ at the sample plane (step S72).

Processing for calculating a height of sample S is then performed. More specifically, processing apparatus 100 calculates a height h(x, y) of sample S based on amount of phase shift $\Delta\theta(x, y)$ (step S74). A relational expression shown in the expression (21) above is used for calculation of height h of sample S.

Finally, processing apparatus 100 calculates a geometric profile of sample S by aggregating thicknesses h(x, y) at coordinates on the sample plane (step S76).

The geometry of sample S can be calculated through processing as above.

E. Modification of Second Embodiment

Several modifications of the optical system in optical measurement system 2 according to the second embodiment will be exemplified.

(e1: First Modification)

FIG. 10 is a schematic diagram showing an exemplary configuration of an optical measurement system 2A according to a first modification of the second embodiment. FIG. 10 (A) shows an optical system in recording of an in-line reference beam and FIG. 10 (B) shows an optical system in recording of an object beam. Optical measurement system 2A can configure the optical systems shown in FIGS. 10 (A) and (B).

Since the optical system shown in FIG. 10 (A) is the same as the optical system in recording of the in-line reference beam in optical measurement system 1 according to the first embodiment shown in FIG. 1 (A), detailed description thereof will not be repeated.

The optical system shown in FIG. 10 (B) is different from the optical system in recording of the in-line reference beam in optical measurement system 2 according to the second embodiment shown in FIG. 8 (B) in position where mask A2 is arranged. More specifically, mask A2 is arranged between sample S and image sensor D. In the optical system shown in FIG. 10 (B), mask A2 is arranged adjacently to sample S.

Illumination light Q is reflected by half minor HM2 of beam splitter BS2 to illuminate sample S. At this time, illumination light Q passes through mask A2, and hence the range within which sample S is illuminated with illumination light Q is restricted to the predetermined range.

Object beam O obtained by illumination of sample S with illumination light Q (that is, light reflected by sample S) then passes through half mirror HM2 of beam splitter B S2 and is guided to image sensor D. At this time, since object beam O produced by illumination of sample S with illumination light Q also passes through mask A2, the range through which object beam O passes is restricted to the predetermined range.

Thus, in the optical system shown in FIG. 10 (B), mask A2 restricts the range of illumination with illumination light Q and restricts also the range of passage of object beam O obtained by illumination of sample S with illumination light Q. Mask A2 thus corresponds to the restriction mechanism that restricts spread of light (object beam obtained by illumination of sample S with illumination light Q (first light) to be kept within the predetermined range. By restriction of spread of object beam O, unwanted light can be reduced and measurement accuracy can be enhanced.

Since details of mask A2 have been described above, description thereof will not be repeated. The opening pattern should only be designed as appropriate depending on a position where mask A2 is arranged.

Since the processing procedure or the like is similar to that in the second embodiment, detailed description thereof will not be repeated.

(e2: Second Modification)

FIG. 11 is a schematic diagram showing an exemplary configuration of an optical measurement system 2B according to a second modification of the second embodiment. FIG. 11 (A) shows an optical system in recording of an in-line reference beam and FIG. 11 (B) shows an optical system in recording of an object beam. Optical measurement system 2B can configure the optical systems shown in FIGS. 11 (A) and (B).

In the optical system shown in FIG. 11, the optical path of off-axis reference beam R is arranged on a rear surface side of image sensor D. According to the optical system shown in FIG. 11, except for recording of in-line reference beam L, the optical path does not extend across sample S, and hence measurement also for sample S larger in area is facilitated.

The optical system of optical measurement system 2B shown in FIG. 11 (A) is different from the optical systems shown in FIGS. 1 (A) and 8 (A) in arrangement of a minor M11 and a minor M12 instead of minor M1.

Off-axis reference beam R resulting from dividing by beam splitter BS1 is reflected by mirror M11 and thereafter further reflected by mirror M12, and guided to beam splitter BS2. In other words, minor M11 and mirror M12 guide off-axis reference beam R from the rear surface side of image sensor D to beam splitter BS2.

The configuration is otherwise substantially identical to that of the optical systems shown in FIGS. 1 (A) and 8 (A).

Except that mirror M2 is not provided, the optical system in optical measurement system 2B shown in FIG. 11 (B) is otherwise substantially identical to the optical system shown in FIG. 8 (B).

As shown in FIG. 11 (B), in optical measurement system 2B according to the second modification of the second embodiment, sample S with a larger sample plane can be measured. In order to change relation of optical measurement system 2B and sample S relative to each other, optical measurement system 2B may be moved or sample S may be moved.

Since the processing procedure or the like is similar to that in the second embodiment, detailed description thereof will not be repeated.

(e3: Third Modification)

FIG. 12 is a schematic diagram showing an exemplary configuration of an optical measurement system 2C according to a third modification of the second embodiment. FIG. 12 (A) shows an optical system in recording of an in-line reference beam and FIG. 12 (B) shows an optical system in recording of an object beam. Optical measurement system 2C can configure the optical systems shown in FIGS. 12 (A) and (B).

In the optical system shown in FIG. 12, a position of illumination with illumination light Q is arranged on the outside of beam splitter BS2. According to the optical system shown in FIG. 12, unwanted light caused by reflection in beam splitter BS2 can be reduced and noise can be suppressed.

The optical system in optical measurement system 2C shown in FIG. 12 (A) is identical to the optical system shown in FIG. 11 (A).

The optical system in optical measurement system 2C shown in FIG. 12 (B) is different from the optical system shown in FIG. 11 (B) in that the position where sample S is arranged is changed to the outside of beam splitter BS2. Sample S is arranged such that the sample plane of sample S is inclined at a predetermined angle with respect to the optical axis of lens L3. Mask A2 is also arranged as being inclined at a predetermined angle with respect to the optical axis of lens L3 in correspondence with the inclination of sample S. By arranging mask A2 as being inclined, an image of opening pattern SP2 in mask A2 can be formed on sample S.

Though FIG. 12 (B) shows an exemplary optical system in which the optical path of off-axis reference beam R is defined on a lower side of beam splitter BS2 in the sheet plane, it may be defined on an upper side in the sheet plane with beam splitter BS2 being inverted, or defined in a forward or rearward direction in the sheet plane with beam splitter BS2 being rotated by ninety degrees.

Since sample S is arranged as being inclined, in processing for reconstructing a hologram, the optical wave distribution is calculated by having the reconstruction object beam hologram propagate to the sample plane by plane wave expansion, and the coordinate system of the calculated optical wave distribution is transformed with rotation in accordance with the inclination of sample S. The optical wave distribution at the sample plane of sample S arranged as being inclined can thus be calculated.

Since the processing procedure or the like is otherwise similar to that in the second embodiment, detailed description thereof will not be repeated.

(e4: Fourth Modification)

In the second and third modifications described above as well, mask A2 may be arranged at an arrangement position similar to the position where mask A2 is arranged shown in the first modification described above.

F. Processing Apparatus 100

(f1: Exemplary Hardware Configuration)

Figure 13:
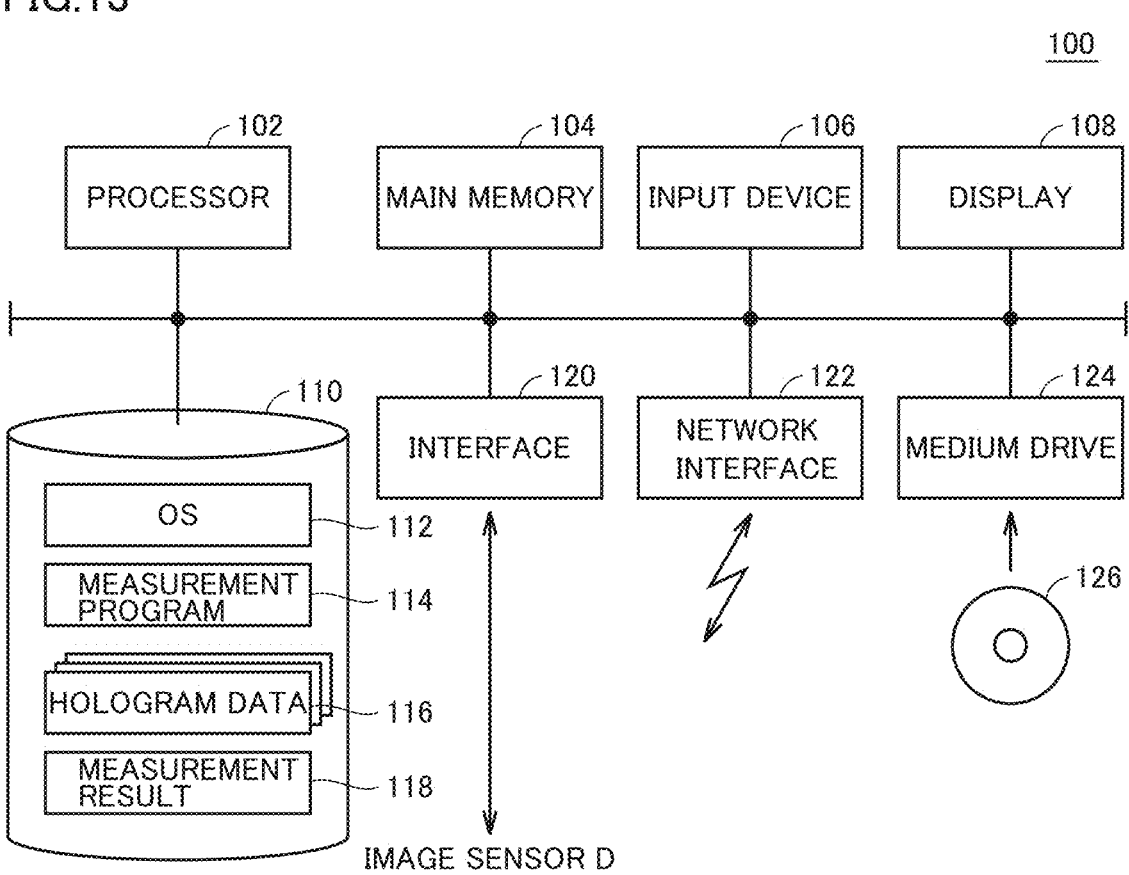
FIG. 13 is a schematic diagram showing an exemplary hardware configuration of a processing apparatus included in the optical measurement system according to the present embodiment.

FIG. 13 is a schematic diagram showing an exemplary hardware configuration of processing apparatus 100 included in the optical measurement system according to the present embodiment. Referring to FIG. 13, processing apparatus 100 includes a processor 102, a main memory 104, an input device 106, a display 108, a storage 110, an interface 120, a network interface 122, and a medium drive 124 as its main hardware elements.

Processor 102 is typically a computing processing unit such as a central processing unit (CPU) or a graphics processing unit (GPU), and it reads one program or a plurality of programs stored in storage 110 on main memory 104 and executes the same. Main memory 104 is a volatile memory such as a dynamic random access memory (DRAM) or a static random access memory (SRAM), and functions as a working memory for execution of a program by processor 102.

Input device 106 includes a keyboard, a mouse, and the like and accepts an operation from a user. Display 108 provides output of a result of execution of a program by processor 102 to a user.

Storage 110 is implemented by a non-volatile memory such as a hard disk or a flash memory, and various programs and data are stored therein. More specifically, an operating system (OS) 112, a measurement program 114, hologram data 116, and a measurement result 118 are held in storage 110.

Operating system 112 provides an environment where processor 102 executes a program. Measurement program 114 implements an optical measurement method according to the present embodiment by being executed by processor 102. Hologram data 116 corresponds to image data outputted from image sensor D. Measurement result 118 includes a measurement result obtained by execution of measurement program 114.

Interface 120 mediates data transmission between processing apparatus 100 and image sensor D. Network interface 122 mediates data transmission between processing apparatus 100 and an external server apparatus.

Medium drive 124 reads necessary data from a recording medium 126 (for example, an optical disc) where a program to be executed by processor 102 is stored and has the data stored in storage 110. Measurement program 114 or the like executed in processing apparatus 100 may be installed through recording medium 126 or downloaded from a server apparatus through network interface 122 or the like.

Measurement program 114 may perform processing by calling a necessary module out of program modules provided as a part of operating system 112 in a predetermined sequence and at predetermined timing. In such a case, measurement program 114 not including the modules is also encompassed in the technical scope of the present invention. Measurement program 114 may be provided as being incorporated as a part of another program.

All or some of functions provided by execution of a program by processor 102 of processing apparatus 100 may be implemented by a hard-wired logic circuit (for example, a field-programmable gate array (FPGA) or an application specific integrated circuit (ASIC)).

Since the exemplary hardware configuration of processing apparatus 100 is also similar in another embodiment, detailed description thereof will not be repeated.

(f2: Exemplary Functional Configuration)

Figure 14:
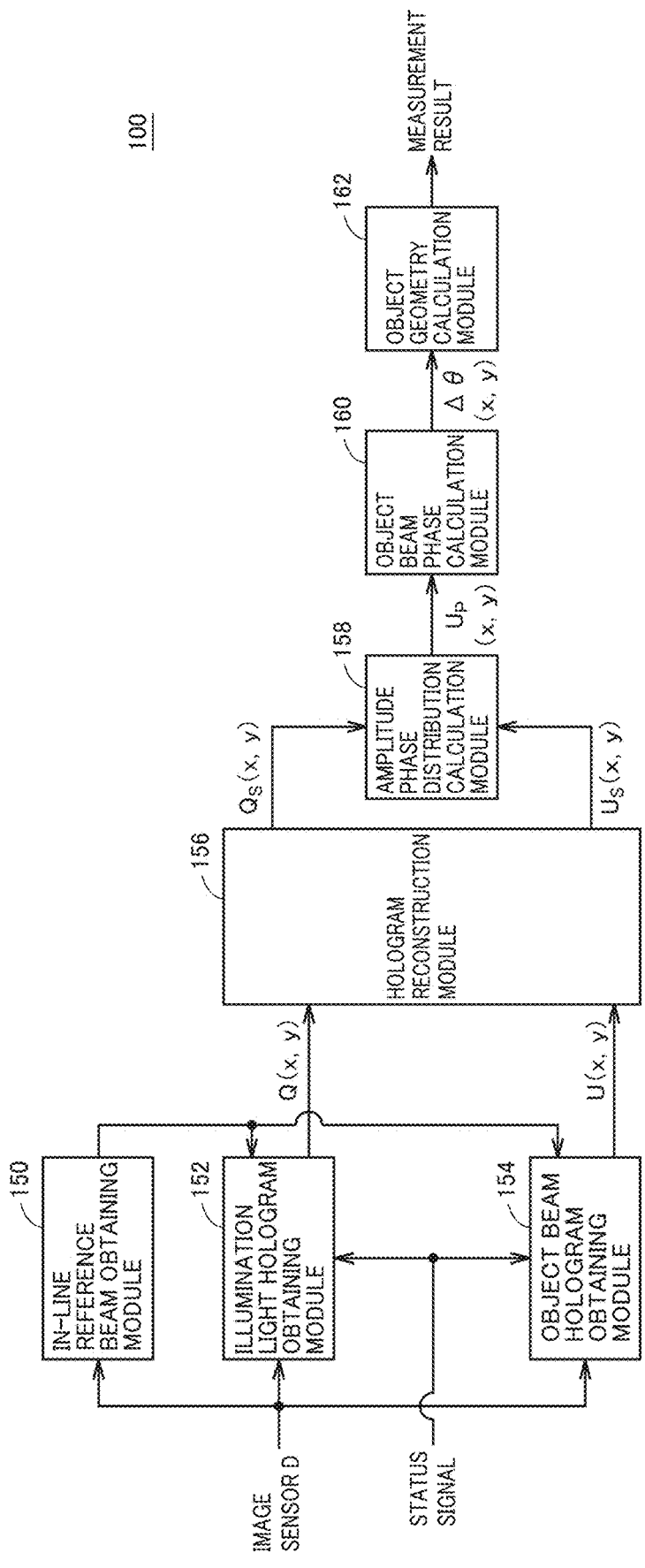
FIG. 14 is a schematic diagram showing an exemplary functional configuration of the processing apparatus included in the optical measurement system according to the present embodiment.

FIG. 14 is a schematic diagram showing an exemplary functional configuration of processing apparatus 100 included in the optical measurement system according to the present embodiment. Each functional element shown in FIG. 14 may typically be implemented by execution of measurement program 114 by processor 102 of processing apparatus 100. Hardware appropriate for each age is selected as hardware that implements the functional configuration shown in FIG. 14.

Referring to FIG. 14, processing apparatus 100 includes, as its main functional elements, an in-line reference beam obtaining module 150, an illumination light hologram obtaining module 152, an object beam hologram obtaining module 154, a hologram reconstruction module 156, an amplitude phase distribution calculation module 158, an object beam phase calculation module 160, and an object geometry calculation module 162.

In-line reference beam obtaining module 150 has a hologram recorded with image sensor D recorded as off-axis hologram $I_{LR}$ while the optical system in recording of the in-line reference beam is set up.

Illumination light hologram obtaining module 152 obtains illumination light hologram Q(x, y) recorded with image sensor D while the optical system in recording of the object beam is set up.

Object beam hologram obtaining module 154 obtains object beam hologram U(x, y) recorded with image sensor D while the optical system in recording of the object beam is set up.

Illumination light hologram obtaining module 152 and object beam hologram obtaining module 154 are both configured to record a detection signal from image sensor D, and any one of them is activated in response to a status signal set manually or automatically.

Hologram reconstruction module 156 calculates a reconstruction illumination light hologram (illumination light profile $Q_\Sigma(x, y)$) from illumination light hologram Q(x, y) obtained by illumination light hologram obtaining module 152 and calculates reconstruction object beam hologram $U_\Sigma(x, y)$ from object beam hologram U(x, y) obtained by object beam hologram obtaining module 154.

Furthermore, hologram reconstruction module 156 has illumination light profile $Q_\Sigma(x, y)$ and reconstruction object beam hologram $U_\Sigma(x, y)$ propagate to the position of the sample plane by plane wave expansion and calculates illumination light distribution $Q_S(x, y)$ and object beam distribution $U_S(x, y)$ at the sample plane.

Amplitude phase distribution calculation module 158 calculates amplitude phase distribution $U_P(x, y)$ at the sample plane by dividing object beam distribution $U_S(x, y)$ by illumination light distribution $Q_S(x, y)$.

Object beam phase calculation module 160 calculates amount of phase shift $\Delta\theta(x, y)$ from the angle of deviation of amplitude phase distribution $U_P(x, y)$ at the sample plane.

Object geometry calculation module 162 calculates information (a thickness, an index of refraction, or the like) for specifying the geometry of the sample based on amount of phase shift $\Delta\theta(x, y)$. Object geometry calculation module 162 outputs a result of calculation as information on the geometry of sample S.

G. Experimental Example

An exemplary effect of mask A2 for restricting the range of illumination light Q adopted by the optical measurement system according to the present embodiment will now be described.

Figure 15:
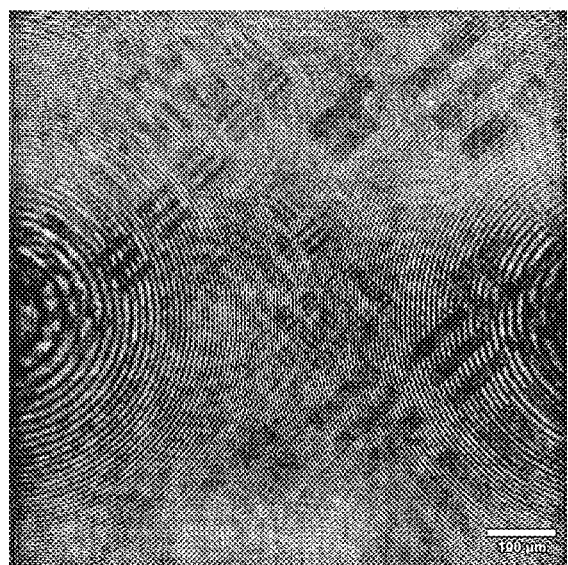
FIG. 15 is a diagram showing an exemplary effect of the mask adopted in the optical measurement system according to the present embodiment.

FIG. 15 is a diagram showing an exemplary effect of the mask adopted in the optical measurement system according to the present embodiment. FIG. 15 shows an exemplary image of reconstructed intensity of a USAF 1951 test target recorded with the use of optical measurement system 1 in which the transmission optical system shown in FIG. 1 is adopted.

FIG. 15 (A) shows an exemplary image of reconstructed intensity based on the hologram recorded with mask A2 having been removed and FIG. 15 (B) shows an exemplary image of reconstructed intensity based on the hologram recorded with mask A2 being arranged.

It can be seen that significant deterioration of the image occurs in the image of reconstructed intensity shown in FIG. 15 (A). Since the range of the illumination light is not restricted, in a spectrum band, the direct image component is superimposed on the conjugate image component and aliasing light generated as a result of failure in satisfying the sampling theorem. Consequently, significant deterioration of the image occurs.

In contrast, in the image of the reconstructed intensity shown in FIG. 15 (B), the range of irradiation with illumination light is generally restricted to be kept within a dashed line in the figure. It can thus be seen that, in the spectrum band, the direct image component is not superimposed on the conjugate image component and aliasing light and that deterioration of the image is suppressed.

Furthermore, it can be confirmed in the image of reconstructed intensity shown in FIG. 15 (B) that knife-edge diffraction that may occur at the edge of the range of illumination can be suppressed and the range of illumination can be controlled in increments of several ten micrometers by formation of an image corresponding to opening pattern SP1 on image sensor D with the use of mask A2.

H. Another Embodiment

As described above, processing for obtaining off-axis hologram $I_{LR}$ (processing in steps S2 and S4 in FIG. 6 and processing in steps S52 and S54 in FIG. 9) is performed for improvement of accuracy of the reconstructed image, and it is skipped depending on required accuracy.

When off-axis hologram $I_{LR}$ is not obtained, calculation processing in accordance with the expression (8) described above is not performed, and complex amplitude off-axis hologram $J_{OR}$ shown in the expression (7) should only be adopted as it is as object beam hologram U(x, y).

Alternatively, the component of off-axis reference beam R ($=R_0exp(i\phi_R)$) may be eliminated from complex amplitude off-axis hologram $J_{OR}$ shown in the expression (7), and resultant complex amplitude off-axis hologram $J_{OR}$ may be adopted as object beam hologram U(x, y). In elimination of off-axis reference beam R, complex amplitude off-axis hologram $J_{OR}$ shown in the expression (7) should only be divided by a complex conjugate of off-axis reference beam R. A distribution of off-axis reference beam R is calculated with a method of calculation from an analytical solution of a spherical wave based on physical arrangement of the point light source of off-axis reference beam R.

When off-axis hologram $I_{LR}$ is not obtained, in addition to the expression (8) described above, the expressions (4), (6), and (9) are not used.

I. Modification

The optical systems described above are by way of example, and depending on required specifications or restriction imposed by a space or the like, any optically equivalent modification can be made. For example, a single lens may be modified to a lens assembly, or any reflection member can be employed instead of the mirror.

Though an exemplary implementation in which processing apparatus 100 performs computing processing involved with measurement of the geometry of sample S is exemplified in the description above, any form of implementation can be adopted without being limited as such. For example, a computing resource on a cloud may be used to perform a part or the entirety of processing for which processing apparatus 100 is responsible.

J. Summary

In an optical measurement apparatus according to the present embodiment, a range where a sample is illuminated with illumination light is restricted to a predetermined range, so that superimposition of a component containing information on an object beam on a light intensity component and a conjugate optical component in a Fourier space (spatial frequency domain) can be avoided. Consequently, noise due to superimposition between components can be suppressed and more accurate measurement can be realized.

By making design such that a maximum area can be secured in the Fourier space (spatial frequency domain) within a range where superimposition between components does not occur, more information can be obtained and measurement accuracy can be enhanced.

Thus, in the optical measurement apparatus according to the present embodiment, an image of the restriction mechanism (mask) arranged at a position different from the sample plane is formed at a sample position, so that the range where the sample is illuminated can be controlled to any shape and a frequency band of the image sensor capable of recording a hologram can efficiently be made use of.

The optical measurement apparatus according to the present embodiment is configured such that an image that has passed through the restriction mechanism (mask) arranged in the stage subsequent to the sample plane is incident on the image sensor. Thus, the frequency band of the image sensor capable of recording the hologram can efficiently be made use of.

The optical measurement system according to the present embodiment measures the geometry of the sample with the use of information on the phase of the object beam. Therefore, a depth resolution (a resolution on the z axis) is not restricted to a depth of focus, and the geometry of the sample can be measured on the order of nm. The optical measurement system according to the present embodiment can record the distribution of the complex amplitude of light in one shot by adoption of the off-axis holography optical system. Thus, physical scanning or phase shift is not required, and a measurement value of a thickness (or a height) of the sample plane is not affected by vibration. The hologram recorded in one shot is perfect as the complex amplitude of an optical wave, and measurement accuracy can be maintained even after correction processing such as focusing and coordinate correction with software.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1, 1A, 2, 2A, 2B, 2C optical measurement system; 10 light source; 20 image formation optical system; 100 processing apparatus; 102 processor; 104 main memory; 106 input device; 108 display; 110 storage; 112 operating system; 114 measurement program; 116 hologram data; 118 measurement result; 120 interface; 122 network interface; 124 medium drive; 126 recording medium; 150 in-line reference beam obtaining module; 152 illumination light hologram obtaining module; 154 object beam hologram obtaining module; 156 hologram reconstruction module; 158 amplitude phase distribution calculation module; 160 object beam phase calculation module; 162 object geometry calculation module; A1, A2 mask; BE beam expander; BS1, BS2 beam splitter; D image sensor; FP1 light condensation point; $I_{LR}$, $I_{OR}$ off-axis hologram; $J_{LR}$, $J_{OR}$ complex amplitude off-axis hologram; $J_{OL}$ complex amplitude in-line hologram; L in-line reference beam; L1, L2, L3, L4, L21, L22, L31, L32 lens; M1, M2, M3, M11, M12 minor; MO objective lens; O object beam; P pinhole; Q illumination light profile; Q illumination light; $Q_S$ illumination light distribution; R off-axis reference beam; S sample; SP1, SP2 opening pattern; $U_\Sigma$ reconstruction object beam hologram; U object beam holo-gram; $U_P$ amplitude phase distribution; $U_S$ object beam distribution; $U_d$ hologram; Wx, Wy bandwidth; d distance; f spatial frequency; h height; kx, ky, kz1 wave number; n1, n2 index of refraction; uc, vc central frequency.

The invention claimed is:

1. An optical measurement system comprising:
a light source;
an image sensor; and
an optical system comprising a beam splitter that divides light from the light source into first light and second light, wherein
the optical system is configured to record with the image sensor, a first hologram resulting from modulation with the second light, of light obtained by illumination of a sample with the first light, the second light being diverging light,
the optical system comprises a restriction mechanism that restricts spread of the light obtained by illumination of the sample with the first light to be kept within a predetermined range,
a size of the predetermined range is determined such that, in a spatial frequency domain of a hologram recorded with the image sensor, a component resulting from the modulation of the first light by the second light is not superimposed on another component, and
the restriction mechanism comprises a mask such that an opening pattern corresponding to the predetermined range is formed in a shielding member.

2. The optical measurement system according to claim 1, wherein
the restriction mechanism restricts a range where the sample is illuminated with the first light to be kept within the predetermined range.

3. The optical measurement system according to claim 1, wherein
the restriction mechanism restricts a range where the light obtained by illumination of the sample with the first light passes to be kept within the predetermined range.

4. The optical measurement system according to claim 1, wherein
the restriction mechanism is configured to be changeable in size of the opening pattern.

5. The optical measurement system according to claim 1, wherein
the optical system is an off-axis holography optical system.

6. The optical measurement system according to claim 1, wherein
the optical system generates the first hologram from transmitted light obtained by illumination of the sample with the first light, and
in the optical system, a second hologram is recorded from transmitted light obtained by illumination with the first light, of a substrate instead of the sample, the substrate not being an object to be measured included in the sample.

7. The optical measurement system according to claim 1, wherein
the optical system generates the first hologram from reflected light obtained by illumination of the sample with the first light, and
in the optical system, a second hologram is recorded from transmitted light obtained by illumination with the first light, of a reference plane instead of the sample.

8. The optical measurement system according to claim 6, further comprising a processing apparatus that calculates a geometry of the sample based on the first hologram and the second hologram.

9. An optical measurement method using an optical system comprising a beam splitter that divides light from a light source into first light and second light, the optical measurement method comprising:
recording with an image sensor, a first hologram resulting from modulation with the second light, of light obtained by illumination of a sample with the first light, the second light being diverging light;
recording with the image sensor, a second hologram resulting from modulation of the first light with the second light while there is no sample, the second light being diverging light; and
calculating a geometry of the sample based on the first hologram and the second hologram, wherein
spread of the light obtained by illumination of the sample with the first light is restricted to be kept within a predetermined range,
a size of the predetermined range is determined such that, in a spatial frequency domain of a hologram recorded with the image sensor, a component resulting from the modulation of the first light by the second light is not superimposed on another component, and
an opening pattern corresponding to the predetermined range is formed in a shielding member.

10. The optical measurement method according to claim 9, wherein
a range where the sample is illuminated with the first light is restricted to be kept within the predetermined range.

11. The optical measurement method according to claim 9, wherein
a range where the light obtained by illumination of the sample with the first light passes is restricted to be kept within the predetermined range.

12. The optical measurement method according to claim 9, further comprising
restricting spread of the light obtained by illumination of the sample with the first light by a mask in which the opening pattern corresponding to the predetermined range is formed in the shielding member.

13. The optical measurement method according to claim 12, wherein
a size of the opening pattern is changeable.

14. The optical measurement method according to claim 9, wherein
the optical system is an off-axis holography optical system.

15. The optical measurement method according to claim 9, further comprising
generating the first hologram from transmitted light obtained by illumination of the sample with the first light.

16. The optical measurement method according to claim 9, further comprising:
generating the first hologram from reflected light obtained by illumination of the sample with the first light; and
recording the second hologram from transmitted light obtained by illumination with the first light, of a reference plane instead of the sample.

17. The optical measurement system according to claim 1, wherein
the another component is at least one of a complex conjugate of the component or another component that is not modulated by the first light.

18. The optical measurement method according to claim 9, wherein the another component is at least one of a complex conjugate of the component or another component that is not modulated by the first light.

\* \* \* \* \*